United States Patent [19]

Davis

[11] Patent Number: 4,509,150

[45] Date of Patent: Apr. 2, 1985

[54] LINEAR PREDICTION CODING FOR COMPRESSING OF SEISMIC DATA

[75] Inventor: Aaron J. Davis, Dallas, Tex.

[73] Assignee: Mobil Oil Corporation, New York, N.Y.

[21] Appl. No.: 478,214

[22] Filed: Mar. 23, 1983

Related U.S. Application Data

[63] Continuation of Ser. No. 221,559, Dec. 31, 1980.

[51] Int. Cl.³ .............................................. G01N 1/28
[52] U.S. Cl. ...................................... 367/76; 367/46; 367/74; 364/422
[58] Field of Search ...................... 367/46, 74, 76, 77; 364/422, 513; 375/26

[56] References Cited

U.S. PATENT DOCUMENTS

| | | | |
|---|---|---|---|
| 3,778,825 | 12/1973 | Ares et al. | 343/7 A |
| 3,860,759 | 1/1975 | Miller et al. | 367/14 |
| 3,973,199 | 8/1976 | Widmer | 455/72 |
| 4,070,709 | 1/1978 | Roberts et al. | 364/602 |
| 4,133,976 | 1/1979 | Atal et al. | 179/1 SA |
| 4,301,329 | 11/1981 | Taguchi | 179/1 SA |
| 4,303,803 | 12/1981 | Yatsuzaka | 179/15.55 T |

FOREIGN PATENT DOCUMENTS

| | | | |
|---|---|---|---|
| 1941336 | 8/1969 | Fed. Rep. of Germany | 179/1 SA |
| 2344494 | 3/1974 | Fed. Rep. of Germany | 179/1 SA |
| 1216836 | 1/1972 | United Kingdom | |
| 1335101 | 10/1973 | United Kingdom | |

OTHER PUBLICATIONS

Jayant, N. S., "Adaptive Quantization with a One-Word Memory", *Bell System Technical Journal*, V. 52, No. 7, Sep. 1973, pp. 1119-1144.
Max, J., "Quantizing for Minimum Distortion", *IRE Transactions on Information Theory*, V. 6, pp. 7-12 (1960).
Wood, L. C., "Seismic Data Compression Methods", *Geophysics*, vol. 39, No. 4 (1974), pp. 499-525.
Jayant, N. S., "Digital Coding of Speech Waveforms: PCM, DPCM, and DM Quantizers", *Proceedings of the IEEE*, vol. 62, No. 5, May, 1974.
Rabiner and Schafer, *Digital Processing of Speech Signals*, Prentice-Hall, Englewood Cliffs, N.J., (1978), Ch. 8 at Sect. 8.1.1.
L. C. Wood et al., "The Debubbling of Marine Source Signatures", Geophysics, vol. 43, No. 4 (Jun. 1978), pp. 715-729.
Atal et al., "Adaptive Predictive Coding . . . ", 10/70, pp. 1973-1986, Bell Sys. Tech. J. (USA), vol. 49, #8.
Makhoul, "Linear Prediction: A Tutorial Review", 4/75, pp. 561-564, Proc. of the IEEE, vol. 63, #4.
Cummiskey et al., "Adaptive Quantization in Differential . . . ", 9/73, pp. 1105-1118, Bell Syst. Tech. J. (USA), vol. 52, #7.
Hanson et al., "Subjective Evaluation . . . Coding", 2/78, pp. 201-208, IEEE Trans. Commu., vol. COM-26, #2.
Kortman, "Redundancy Reduction . . . Data Compression", 3/67, pp. 253-262, Proc. IEEE, vol. 55, #3.
Crochiere et al., "Digital Coding . . . ", 10/76, pp. 1069-1085, Bell Syst. Tech. J., vol. 55, #8.
Golding et al., "Study of an Adaptive Quantizer", 3/67, pp. 293-297, Proc. IEEE, vol. 55, #3.
Siegel, L. J., "Parallel Processing Algorithms for Linear Predictive Coding", 4/80, pp. 960-963, IEEE Conf. on Acoustics, Speech and Signal Processing, vol. 3.

*Primary Examiner*—Nelson Moskowitz
*Attorney, Agent, or Firm*—Alexander J. McKillop; Michael G. Gilman; Charles J. Speciale

[57] ABSTRACT

A seismic data compression technique is disclosed which comprises sampling each individual seismic trace, operating upon a set number of samples to generate a predicted sample and quantizing the difference between the next sample and the predicted value of the sample, and transmitting the quantum number whereby the amount of information which need be transmitted is limited. In a preferred embodiment, a linear prediction differential pulse code modulation scheme is used to provide the predicted value, while an adaptive quantization scheme is used to quantize the error value to be transmitted, thus yielding further improvements in accuracy. A feedback loop can be applied to the decompression operation to limit quantization noise and further improve the fidelity of representation of the decompressed signals.

10 Claims, 22 Drawing Figures

FIVE TEST RECORDS AT INPUT a) FULL WORD CODING (FWC)
b) LINEAR PREDICTION DPCM (LPDPCM)
c) RUNNING SUM DPCM (RSDPCM)
d) SIMPLE DPCM (SDPCM)
e) GAIN BIT ONLY CODING (GBOC)

DIFFERENCE RECORDS AT INPUT a) FWC — LPDPCM
b) FWC — RSDPCM
c) FWC — SDPCM
d) FWC — GBOC

FIVE TEST RECORDS AFTER F-K & SPIKE DECON a) FULL WORD
b) LINEAR PREDICTION DPCM
c) RUNNING SUM DPCM
d) SIMPLE DPCM
e) GAIN BIT ONLY CODING

DIFFERENCE RECORDS AFTER FK & SPIKE DECON a) FWC - LPDPCM
b) FWC - RSDPCM
c) FWC - SDPCM
d) FWC - GBOC

FIG. 6  FIVE TEST RECORDS AFTER NMO & STACK
FIG. 7  DIFFERENCE TRACES
    1) FWC - LPDPCM
    2) FWC - RSDPCM
    3) FWC - SDPCM
    4) FWC - GBOC

FIG. 16 (STACK AT TYPOUT = 0 2-BITS)

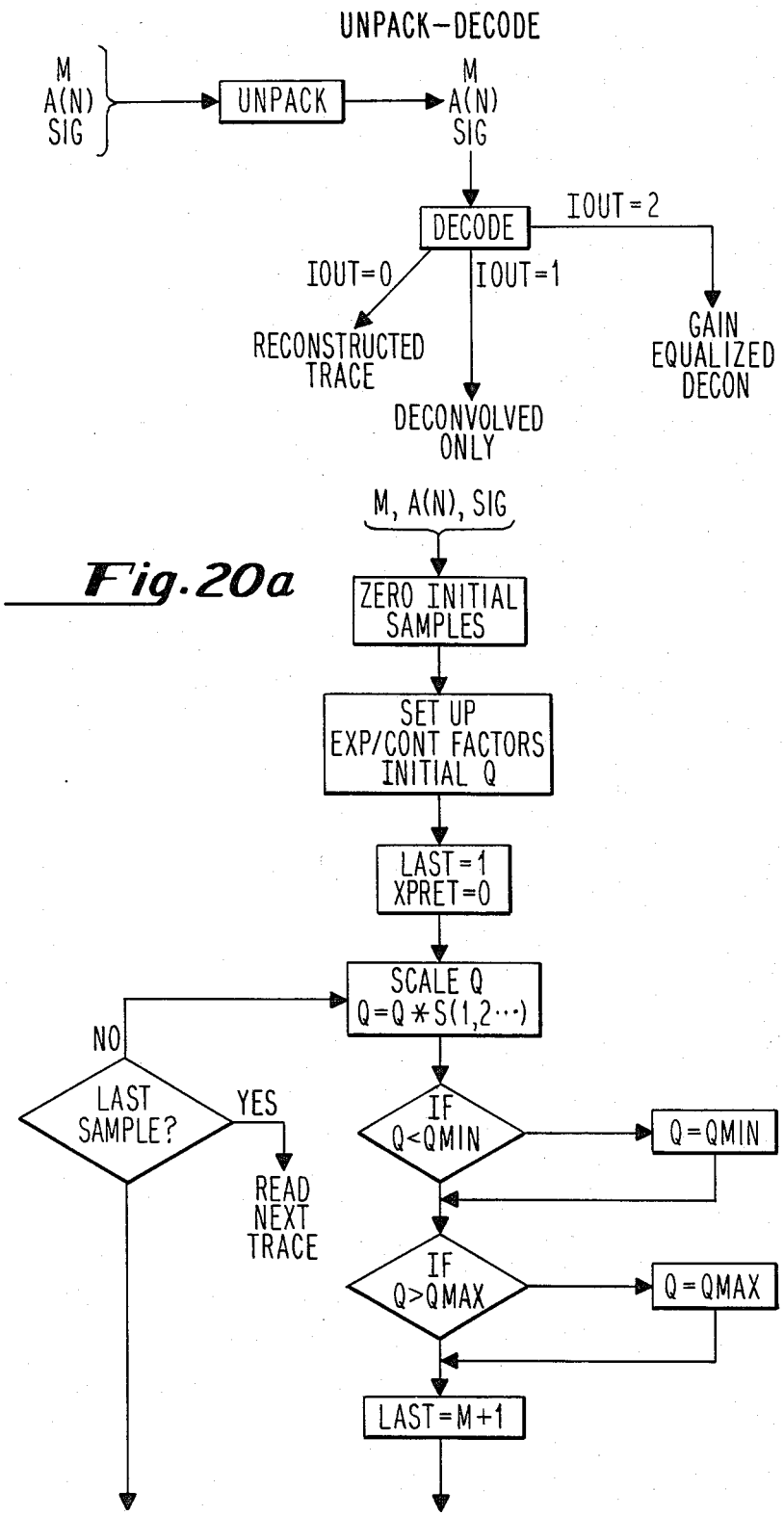

LINEAR PREDICTION CODING FOR COMPRESSING OF SEISMIC DATA

This is a continuation of copending application Ser. No. 221,559, filed Dec. 31, 1980.

FIELD OF THE INVENTION

This invention relates to the field of seismic exploration. More particularly, this invention relates to a method whereby large quantities of digital data resulting from seismic exploration can be compressed so as to be transmitted or stored more efficiently.

BACKGROUND OF THE INVENTION

It has been common for many years to perform seismic exploration for oil, gas and other minerals. Typical techniques employed involve generation of an acoustic wave at the surface of the earth, including the surface of the ocean. This wave travels downwardly into the earth and is reflected from subterranean layers of rock of interest upwardly towards the surface of the earth where its return may be detected. Typically the detectors output analog electrical signals which are converted to digital form and are recorded. Analysis of the recorded signals can then be performed and used to yield a picture of the subterranean structure of the earth which can be interpreted by geophysicists in the search for oil, gas and other valuable minerals.

As part of the expansion of this field, it is desirable to generate better and better pictures which in turn requires the recordation of more and more digital data. At the present time, a typical shipboard exploration system will involve the recordation of samples from 208 trailing geophones, each sampled every 4 msec. to 16 bit accuracy. Recordation of this data proceeds at such speed that an entire reel of magnetic tape is filled in on the order of 10 minutes with this data. Clearly it would be desirable to reduce the amount of data to be stored, if this could be accomplished without loss of accuracy.

A further impetus for the development of useful data compression schemes is that it is frequently desirable, for example, that the data be transmitted from an ocean-going exploration vessel to a home base computer for analysis, while the ocean-going vessel is still in the area of exploration. In this way, if the data is of particular interest, or if for some reason was improperly recorded requiring re-exploration, the ship can return to the area of exploration without having to sail an excessive distance. However, to transmit full digital representations of the seismic data recorded as mentioned above is prohibitively expensive using present day transmission facilities, a situation which is not likely to improve. This is therefore another area in which compression of seismic data could be of use.

Clearly, in order to be useful, data compression techniques may not be permitted to distort the signal too greatly upon decompression. Two particular factors are of concern; the RMS difference between the full word trace and the same trace after having been compressed and decompressed and second, the correlation of the difference trace with a trace of full word accuracy. The RMS error describes quantitatively how much distortion is present in the compressed and decompressed trace. The correlation indicates whether the errors made will stack out (that is, whether upon employment of prior art techniques to reduce random noise in seismic records by summing, the errors will likewise be reduced) and if not, what will be the pattern of the distortion.

Prior art techniques of data compression in seismic systems have failed to provide adequate results. These techniques have fallen into two basic categories. One class involves frequency domain techniques, such as shown best in Wood, L. C., "Seismic Data Compression Methods", *Geophysics*, V. 30 No. 4 (1974) pp. 499-525, and the other has time-domain techniques. Gain bit only quantization has been employed, that is, the full word is characterized by the exponent of the power of 2 nearest the sample; the exponent therefore only need be transmitted. Clearly, this may involve errors equal to half the difference between successive powers of 2. Moreover, the errors are correlated with the amplitude of the signal: as the amplitude of the signal rises, so too does the probable error. Two variations of differential pulse code modulation (DPCM) have also been tried, known as simple DPCM and running sum DPCM. These techniques in general attempt to use the fact that the difference between successive samples are smaller than the samples themselves. However, the running sum DPCM method, although very fast, results in rather high RMS noise. Simple DPCM has smaller distortion but requires a long low cut filter to eliminate propagation errors. Accordingly, while DPCM techniques are useful, there remains a need in the seismic art for improvement on the technique employed.

Application of DPCM techniques and speech encoding are discussed generally in N. S. Jayant, "Digital Coding of Speech Waveforms: PCM, DPCM and DM Quantizers" *Proceedings of the IEEE*, V. 62, No. 5, May, 1964, but in connection with speech waveform coding, not seismic data coding.

It will be appreciated by those skilled in the art that seismic data is of a generally repetitive character; that is, it involves a sinusoidal wave convolved with a reflectivity series. As such, the wave nature of the records, therefore, can be utilized in data compression and one need not assume that the data are random. It is this fact which is exploited by all the differential pulse code modulation techniques mentioned above. The advantage of differential pulse code modulation techniques over gain bit only coding or sign bit coding, in which a sign only is transmitted, indicating whether a given sample is positive or negative, is threefold. First, the errors are many times smaller than those that occur when quantizing the full waveform into a fixed number of binary gain bits. Secondly, the errors are much less correlated than with either gain bit coding or sign bit coding, so that it is less likely that the errors will be enhanced when seismic data processing is performed thereon. Finally, differential pulse code modulation techniques are less sensitive to low frequency noise than are the gain bit and sign bit coding techniques and are therefore much more suitable for f-k filtering, a well known technique commonly employed in seismic data processing to reduce noise. Therefore, it is desirable to use some form of differential pulse code modulation, but as mentioned above, neither simple or running sum DPCM techniques yield results of low enough distortion to be useful.

OBJECTS OF THE INVENTION

It is therefore an object of the invention to provide an improved method of data compression for use in connection with seismic data.

It is a further object of the invention to provide an improved version of differential pulse code modulation coding for use in compression of seismic data for transmission purposes.

Still a further object of the invention is to provide an improved method of seismic data transmission which is more economical of transmission time than in the prior art while not sacrificing accuracy.

A final object of the invention is to provide an improved method of seismic exploration whereby data can be recorded at a first in-field location and transmitted to a home base location for processing. In this way, the results of the processing can be transmitted back to the in-field location during exploration so that if it is necessary to resurvey the area or if an area proves to be of particular interest, indicating further study, this decision can be made while the exploration team, whether a land-based or ship-board crew, is still in the vicinity of interest.

SUMMARY OF THE INVENTION

The above objects of the invention and needs of the art are fulfilled by the present invention which involves a seismic data compression scheme which utilizes linear prediction differential pulse code modulation coding according to which the convoluted nature of seismic data is exploited. A given number of samples are quantized and analyzed to yield a predicted next sample. The difference between the actual next sample and the predicted next sample is then encoded and transmitted. The quantized sample then becomes the last of the preceding samples, used to predict the next actual sample. This technique is referred to as linear prediction waveform coding. It is used in conjunction with an adaptive quantization scheme in which the difference between the predicted and the actual samples is compared with a predetermined number of "bins" or "windows" into which the signal value may be expected to fall. The windows are expanded or contracted in accordance with the results of this comparison. In this way the linear prediction coding scheme with uniform interval adaptive quantization results in the least RMS error as well as the most random correlation of errors with data, as compared with a quantization technique which adapts itself to the signal, resulting in correlation of the errors with the signal. The linear prediction scheme also permits the design of a fixed length data format. Moreover, the linear prediction coding method is not as sensitive to transmission errors since the prediction error is distributed over the length of the operator; that is, over the preceding samples compared with the next sample. The linear prediction differential pulse code modulation scheme of the invention is dependent on the band width of the signal (that is, the broader the band width, the larger the prediction error; therefore, the larger the quantization error). Decimating the data, for example, taking every other sample, reduces the volume of data by a factor of 2, but increases the quantization error as well. Fortunately, seismic data has a relatively invariant low-pass periodic component and can therefore be compressed well using linear prediction since it is the sinusoidal nature of the seismic wave which allows the predicted value to be relatively close to the actual value, allowing a relatively small difference signal to be coded and transmitted at minimum error.

Though in many cases the coded error signals are themselves of interest, without decoding and decompression, upon receipt of the transmitted encoded signal, therefore, the inverse operation can be performed to yield an ouput waveform substantially similar to that encoded. Feedback may be employed during decompression to filter noise, improving the signal-to-noise ratio.

BRIEF DESCRIPTION OF THE DRAWINGS

The invention will be better understood if reference is made to the accompanying drawings in which:

FIGS. 20a and 20b show a detailed flowchart depicting the unpacking and decoding performed on a compressed data stream having been transmitted or stored.

DESCRIPTION OF THE PREFERRED EMBODIMENTS

Figure 1:
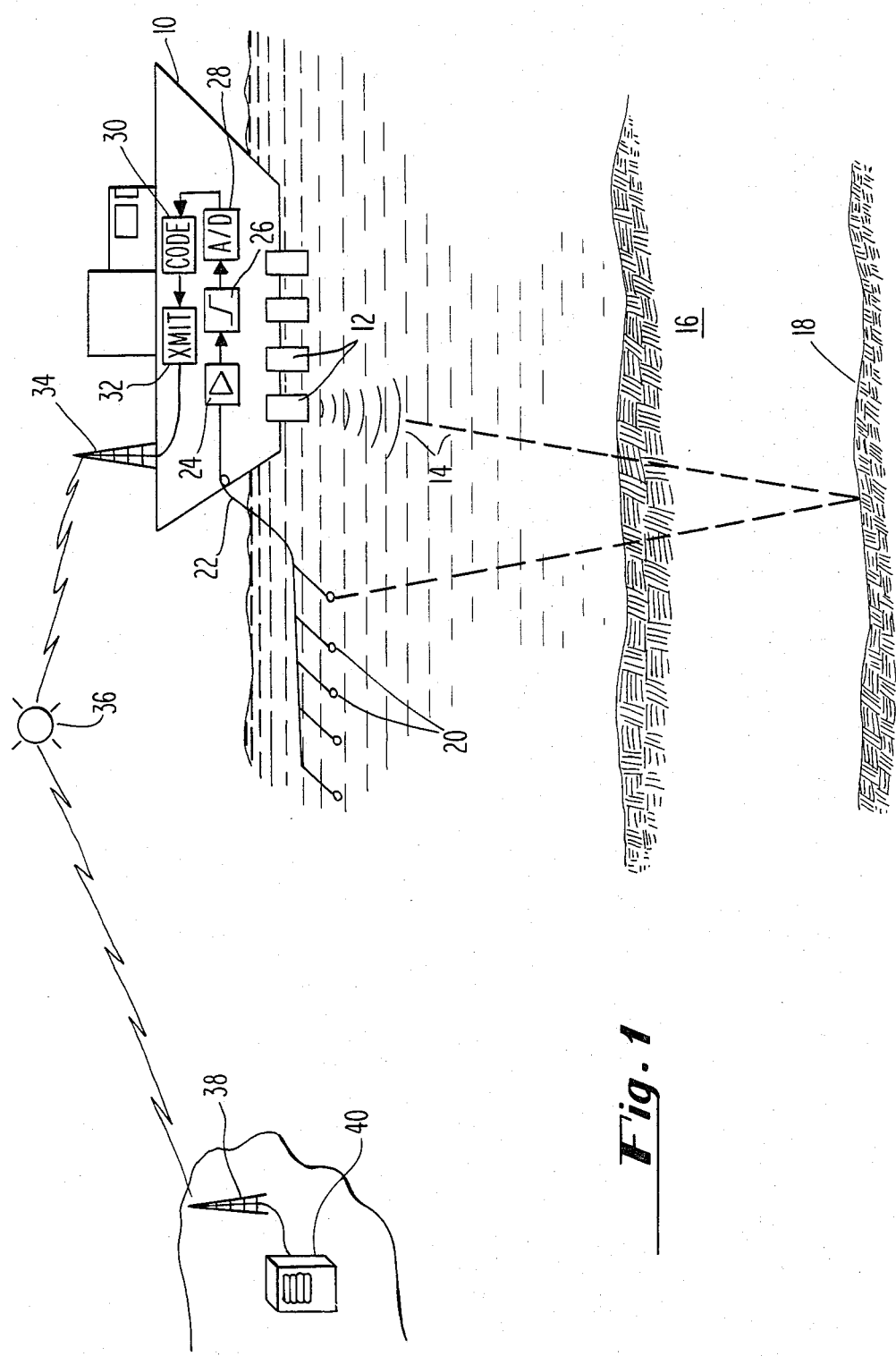
FIG. 1 represents an overall view of the seismic exploration system according to the invention.

FIG. 1 shows in broad outline the arrangement of a seismic marine exploration system according to the invention, though the invention has applicability to land based operations as well. An exploration vessel 10 has mounted thereon a plurality of sources of acoustic energy such as compressed air guns 12 which are controlled to emit an acoustic wave 14 downwardly into the sea. The wave passes through the ocean bottom and the first sub-sea layer 16 and is eventually reflected from a lower layer 18 back upwardly to reach a plurality of hydrophones 20 streamed behind the vessel. The signals output by the hydrophones 20 are passed by means of a cable 22 into conventional processing equipment carried onboard the exploration vessel 10 such as amplifiers 24 and filters 26. The data may be converted to digital format in analog-to-digital converter 28 and may then be encoded in accordance with the invention in a coding processor 30. The compressed data may be stored and/or may be transmitted by means of a transmitter 32 and an antenna 34, optionally via a satellite 36 to an earth-bound antenna 38, possibly for further processing in a computer indicated generally at 40.

As noted above, vast quantities of data are generated during seismic explorations whether on land or on sea and it is therefore desirable to provide methods of data compression whereby the amount of data which must be transmitted is limited. Also as noted above, the seismic data is of a generally wave-like character so that successive samples of the analog signals output by the hydrophones 20 do not vary greatly from one to the next. Thus, for example, a simple differential pulse code modulation scheme may be used which encodes the difference between two successive samples rather than the full amplitude of the data sample. The difference is typically considerably less than the overall amplitude and bits are thereby saved. When the correlation between two samples is high (greater than about 0.5) the differences between successive samples are small.

While this method can be workable, it does not insure that residual low frequency errors are not present which tend to be greatly amplified upon reconstruction by integration at the earth bound processing station 40. Such amplified low frequencies cause drifting and sometimes DC shifts which can be unstable in further processing operations. Therefore, it is necessary to apply a long low cut filter to the samples prior to integration and remove the mean later. Unfortunately, this causes unwanted distortion in the early stage in the processing operation, which is only aggravated by later stages.

An improvement on the simple digital differential pulse code modulation, known as running sum differential pulse code modulation, employs use of recursion to alleviate the low frequency problem mentioned above. The object of this system is to continually adjust for low frequencies by taking the difference between the incoming signal and the running sum over all the previous quantized differences. If there were no errors in the quantization, this operation would be simply the difference trace as above. However, since errors must be expected to occur in the quantization process, the difference to be quantized is the change between two successive inputs plus the quantization error in the previous difference. Each time a large error occurs, it is thus corrected for by the next difference instead of propagating through the entire trace. While this technique is better than simply differencing the data from an error propagation standpoint and allows elimination of the long low cut filter and mean removal mentioned above, there is correlation of the error with the data.

The method which is usually referred to as differential pulse code modulation is here referred to as linear prediction differential pulse code modulation for clarity's sake. As compared to running sum differential pulse code modulation, instead of predicting the last sample using the sum of the previous samples, in this method one attempts to predict the next sample from a linear combination, controlled by a prediction operator, of the past several samples. For example, if the quantization was error free, the difference between the current input and the prediction sample is simply the prediction error. Such a sequence is particularly desirable for quantizing purposes since the spectrum is whitened (i.e., has a broader bandwidth) and the RMS amplitude level is minimized. However, quantization will add noise to the system that must be controlled upon reconstruction or will render reconstruction unreliable. According to the method of the present invention the quantization noise is controlled by feeding back the reconstructed output to the preceding input so as to correct the prediction operator, rather than simply predicting on the basis of a series of inputs.

Figure 1A:
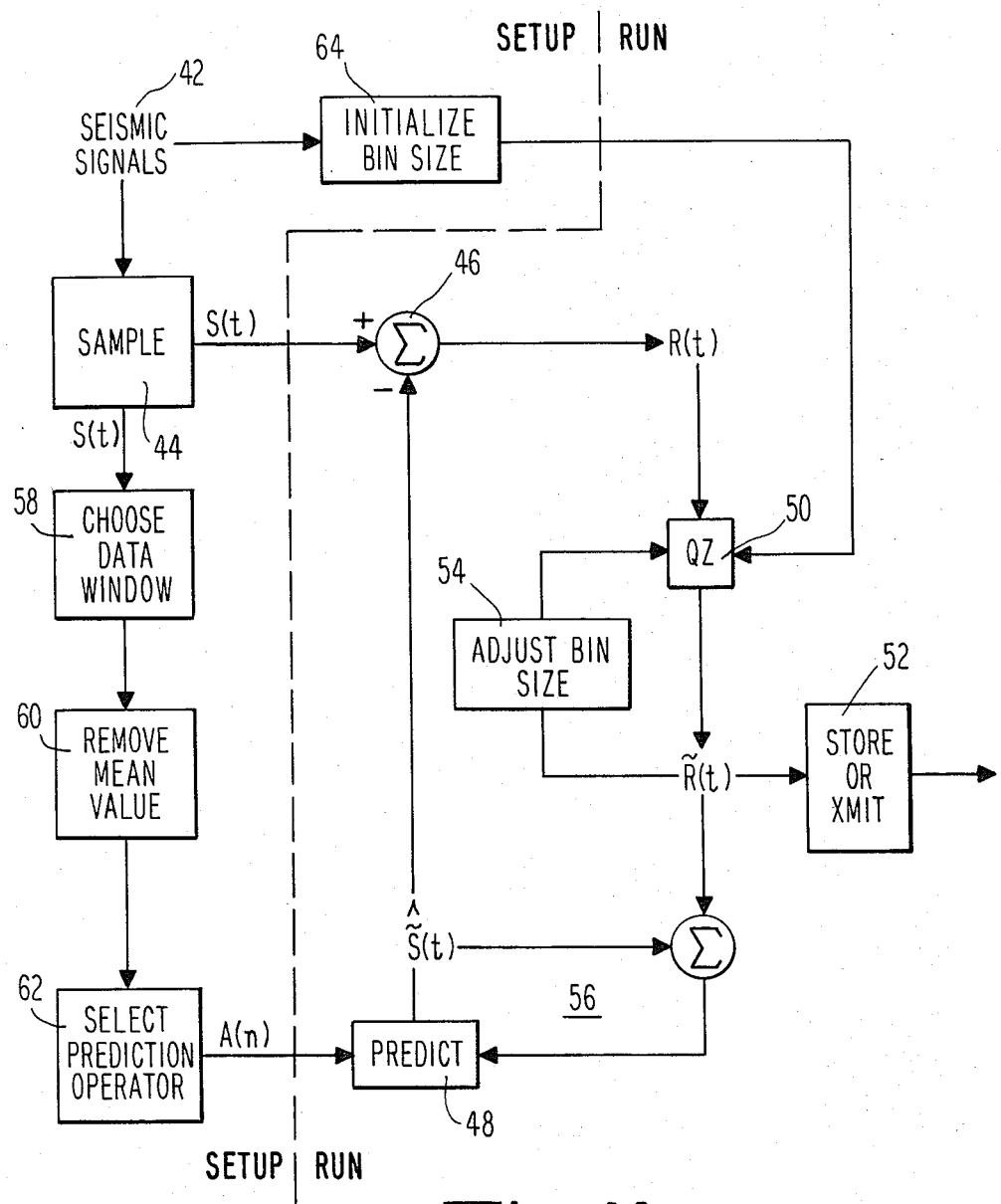
FIG. 1A shows a flowchart of the process of the invention.

FIG. 1A shows the broad concept of the data compression method of the invention. Seismic signals are received from hydrophones as noted at 42. These are sampled at 44 to generate a series of samples S(t). As shown, FIG. 1A is divided into two parts "SET UP" and "RUN". At the beginning of a period of exploration in the "SET UP" period, the prediction operator is first selected at 62 and the bin size is initialized at 64. In the RUN mode, the prediction operator is used at 48 to generate quantized, compressed representations of the seismic data. The prediction operator is selected by choosing a data window at 58, i.e., selecting a predetermined number of samples S(t). The mean value is removed from these at 60. This step, which is also referred to as "autocovariance" is very important because removal of the mean value from the samples insures the low frequency stability of the operator which, as discussed in further detail below, is highly important in the low frequency domain of seismic signals. As noted, selected samples are used to select the prediction operator at 62, a process which is discussed in further detail in connection with FIG. 17 below. Prediction operator selection amounts to generation of a number of linear coefficients A(n) which then are supplied to the prediction operator at 48. The bin size is initialized at 64 simply by taking the average of a number of the seismic signal samples. This is then supplied to a quantizer 50 used as discussed below. When the RUN mode is thereafter entered, the samples S(t) are passed to a summation node 46 where they are compared with a predicted value $$\hat{S}(t)$$

generated by the linear predictor 48 to be discussed in further detail below. The prediction error, i.e. the difference between the two, $\tilde{R}(t)$, is then quantized at 50 to yield a quantum number R(t), which is stored or transmitted at 52 as discussed above. The bin size is then adjusted at 54, rendering the quantization operation 50 adaptive, again as will be discussed in further detail below. A feedback loop 56 may also be incorporated. This will be discussed in detail below.

Figure 2:
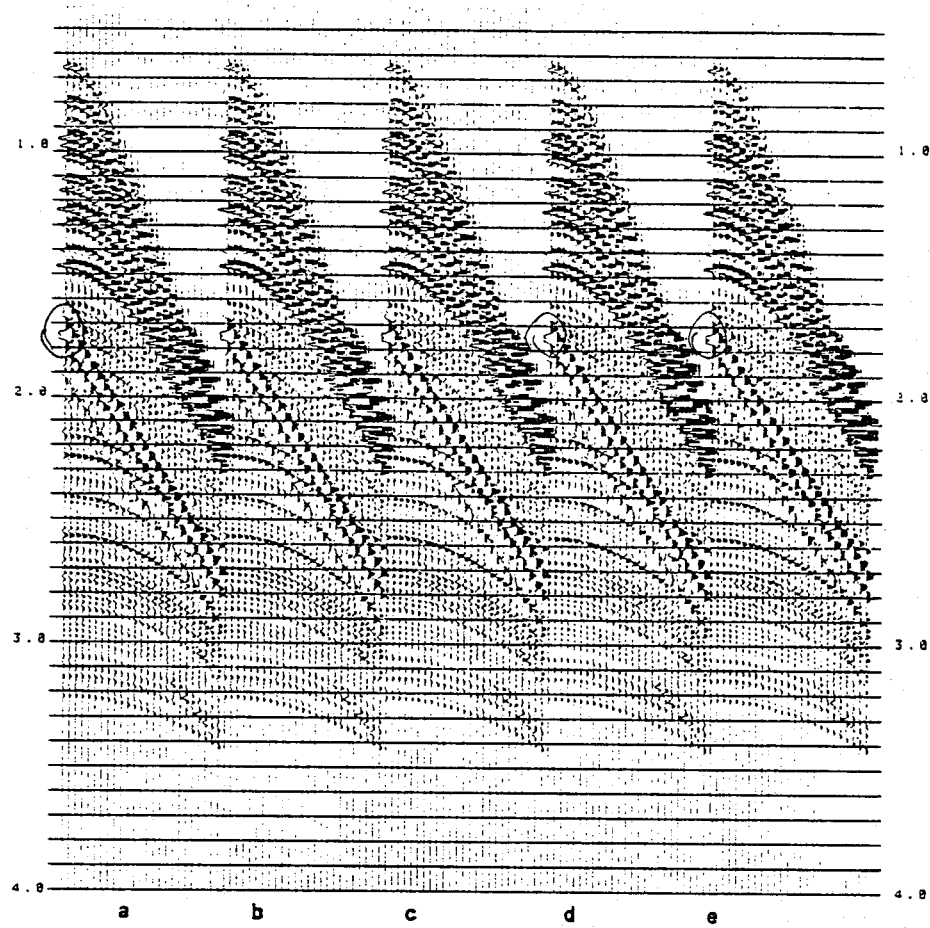
FIG. 2 shows a graphic comparison between full word coding of seismic signals and four compression coding methods considered.
Figure 3:
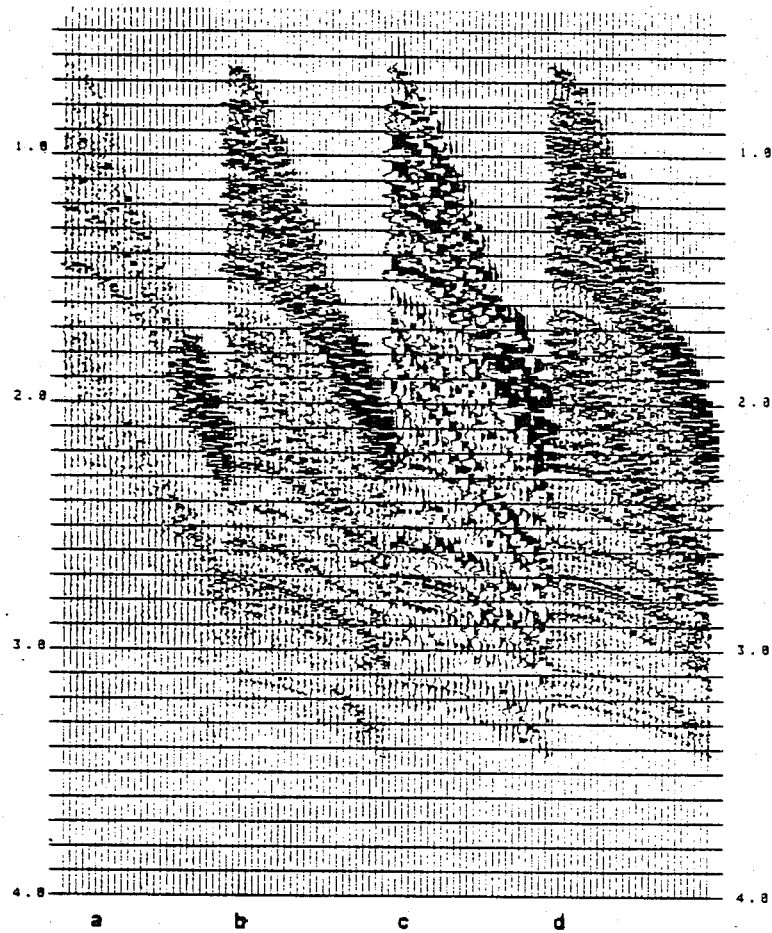
FIG. 3 represents the differences between full word coding and the four compression coding methods shown in FIG. 2.

FIG. 2 shows comparisons of input data with output data generated using four of the techniques discussed above. The five records are all comparable to seismograms, that is, their vertical axis is time while the horizontal axis is distance from a given origin point. FIG. 2a represents a display of synthetic data coded, according to the full 32-bit word sample; this is the type of data which is to be compressed according to the method of the invention. FIG. 2b shows the full word coded data of FIG. 2a having been encoded using linear prediction differential pulse code modulation techniques. FIG. 2c is comparable, using running sum differential pulse code modulation; FIG. 2d, simple differential pulse code modulation; and finally FIG. 2e shows gain bit only coding. Those skilled in the art will recognize that while the five seismograms shown in FIG. 2 are generally similar in outline, nevertheless the quality of the coding drops off appreciably from FIG. 2b to FIG. 2e. This is shown graphically in FIG. 3 which represents results of subtraction of the coded data shown in FIGS. 2b through 2e from the full word data of FIG. 2a, thus providing an indication of the accuracy of the coding scheme employed. FIG. 3a, linear prediction differential pulse code modulation, is clearly the best of the coding techniques tried; significant error is limited to a region between 1.8 and 2.3 sec. One sees that only where the amplitudes are high and the predictability is low, such as the superposition of all the events on the further traces, are the errors in the linear prediction differential pulse code modulation representation significant.

Figure 4:
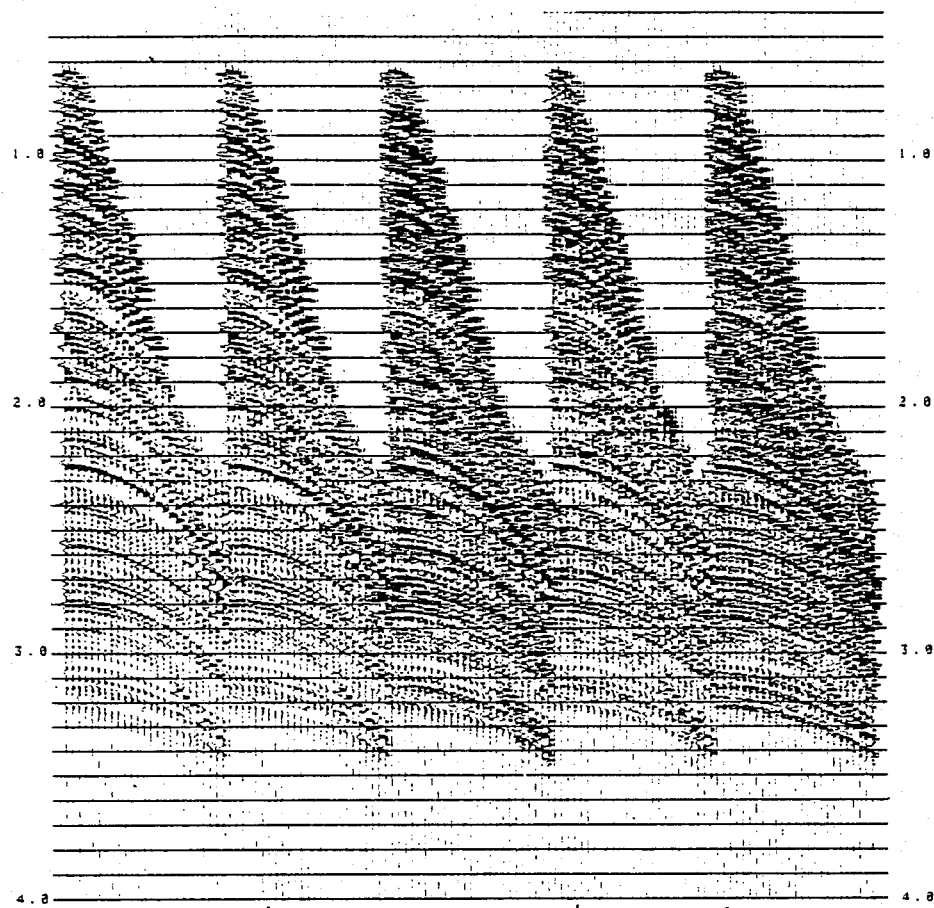
FIG. 4 represents the five records of FIG. 2 after f-k and spike deconvolution processing.

FIG. 4 shows seismograms similar to those of FIG. 2 but after conventional data processing operations have been performed thereon; that is, f-k filtering and spike deconvolution methods. Both these methods relate to the use of mathematical processes for generating coherent frequency information from seismic records. In this case, the "air-burst", the surface noise generated by the acoustic energy was first removed by f-k filtering; spike deconvolution was then applied to the input records. FIG. 4a shows very little high frequency noise, only a small remnant airburst remains in the full word coding system. Likewise, in all three of the differential pulse code modulation methods, shown in FIGS. 4b through 4d, the airburst was successfully attenuated. The gain bit only coding, of FIG. 4e, however, has in addition to a higher noise level, a large remnant airburst. The simple differential pulse code modulation method (FIG. 4d) has been improved over the running sum method of FIG. 4c by a deconvolution operation which removes some effect of the low cut filter discussed above.

Figure 5:
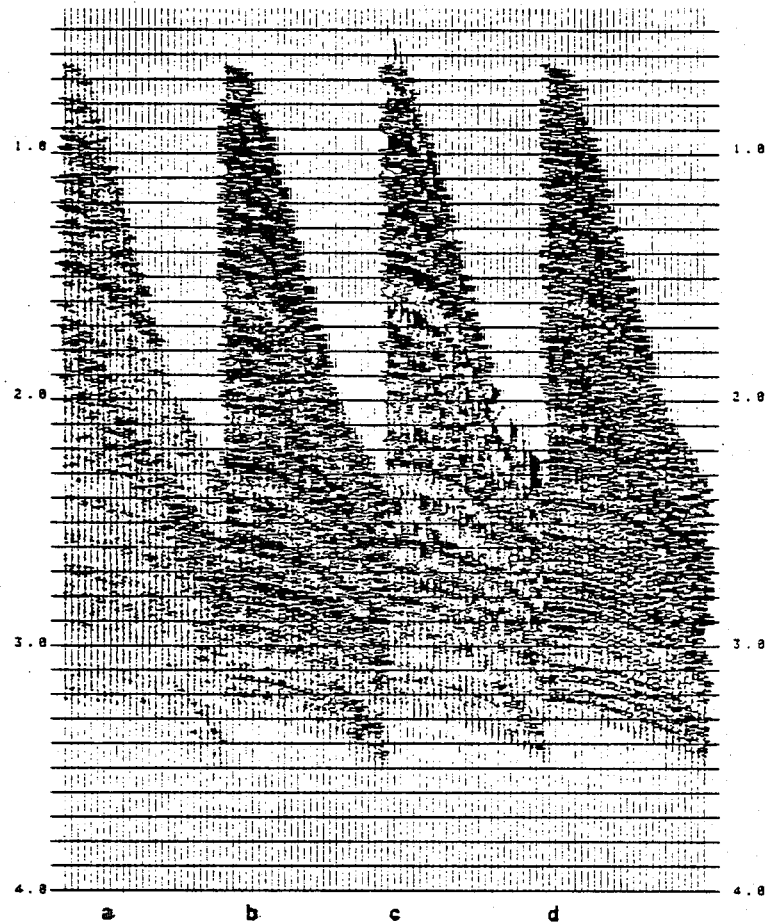
FIG. 5 represents the differences between the full word and the four other encoding techniques considered after f-k and spike deconvolution processing.

The difference records of FIG. 5 are comparable to those of FIG. 3; that is, FIGS. 4b through 4e were subtracted from FIG. 4a to yield FIGS. 5a through 5d, respectively. Again, the linear prediction differential pulse code modulation method of FIG. 5a has the least error, however, it appears that most of the error lies along reflection events which have been deconvoluted. Simple differential pulse code modulation also shows a relatively good signal (FIG. 5c) and again the gain bit only coding (FIG. 5d) is very noisy. Comparison of the signal-to-noise ratios of these records bears this conclusion out. The average RMS signal-to-noise ratio of linear prediction differential pulse code modulation signals averaged over 25 traces is 3.93; of running sum 1.43; of simple differential pulse code modulation 2.03; and gain bit only coding 1.05.

Figures 6, 7:
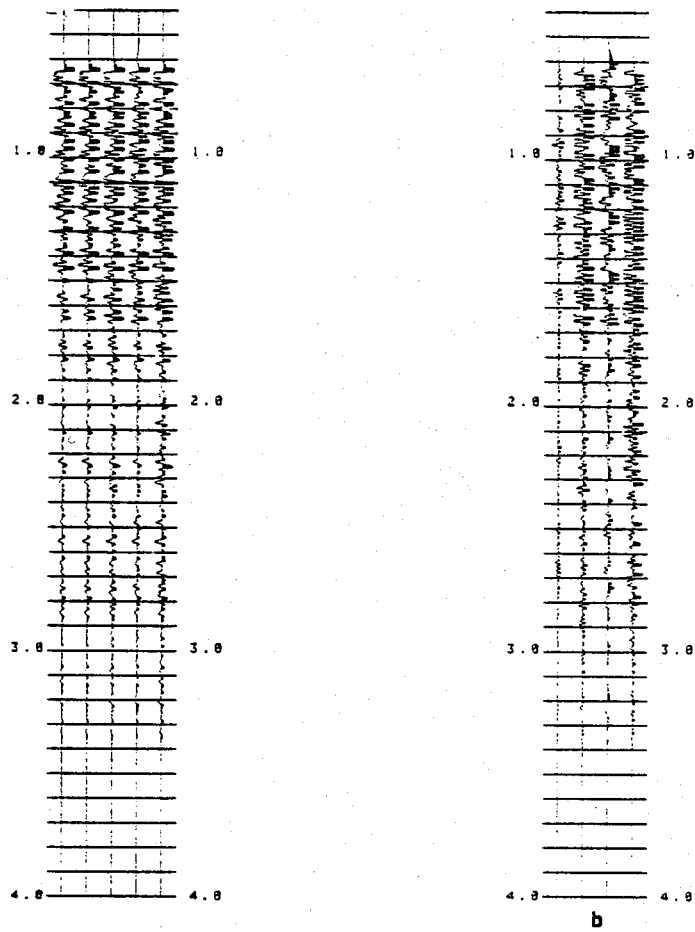
FIG. 6 shows the records of FIG. 4 after normal moveout and stacking operations.
FIG. 7 shows the differences between the normal moveout corrected and stacked full word seismic sample and the four encoded records.

Another well known prior art technique which can be used to improve signal-to-noise ratio in seismic data is normal moveout correction and stacking. In these processes, the records are time corrected for the varying offsets between source and receiver and are stacked, i.e., are summed either mathematically or electrically, whereby the noise, being random, tends to be cancelled out, while the signals are amplified. FIG. 6 shows from left to right examples of this technique having been performed on the five test records of FIGS. 4a-4e, while FIG. 7 shows difference traces of the five traces shown in FIG. 6; that is, the four encoded traces are subtracted from the full word trace of FIG. 6. After application of this technique the signal-to-quantization-noise ratio of the signals processed by the linear prediction differential pulse coding method is 5.7; of running sum 2.63; of simple differential pulse code modulation 3.17 and of gain bit only 1.47. Since none of these ratios were improved by normal moveout correction and stacking by a factor greater than 1.8 (in the case of running sum differential pulse code modulation) one can conclude that the errors in all techniques are not uncorrelated with the data. While linear predictive differential pulse code modulation has the least distortion after processing, from the difference traces of FIG. 7 the errors appear to be less correlated with the data after stacking. Even though simple differential pulse code modulation has a higher signal-to-noise ratio than running sum differential pulse code modulation, the distortion caused by the low cut filter is much more noticeable on the simple DPCM stacked traces than on those processed in accordance with the running sum technique. The gain bit only difference trace exhibits all the major events, but the noise level is very high and every wavelet shows noticeable distortion.

As discussed above, it can be shown that linear prediction differential pulse code modulation coding, assuming a noiseless channel, can be successfully applied to seismic data with minimal distortion. The same results can be demonstrated with real data. Moreover, it was demonstrated that less complicated running sum and simple differential pulse code modulation schemes yield better results than gain bit only coding, but still below the quality received from linear prediction differential pulse code modulation. Another important aspect of the present invention relates to a further improvement on linear prediction differential pulse code modulation. A fixed word length coding scheme is used which, unlike gain only, implies a specific compression ratio. Because seismic data requires an automatic gain ranging capability, the adaptive coding scheme is required. According to this adaptive coding scheme, the quantization windows into which all data must fit are varied with respect to the overall amplitude of the signal. Simply put, the adaptive coding scheme when applied to linear prediction differential pulse code modulation, varies the spacing of the bins or ranges of possible values into which the prediction error trace falls and expands or contracts these range in accordance with the previous output. For example, if the last output indicated that the error was in the outermost bin, the bin size would be expanded for the next input. If the next sample fell in an inner bin, the size would be contracted. In this way, better matching of bin size with error can be achieved, still using a limited number of bins; as only the identification of the bin need be transmitted and/or stored, substantial data compression is achieved. Thus, while the adaptive quantization scheme is very parsimonious with respect to the number of bits required, it still has the ability to adjust itself to the magnitude of the signal. It is particularly useful in the case of a seismic data recording, wherein the amplitude decays slowly as a function of time as well as varying gradually from one sample to the next.

Figure 8:
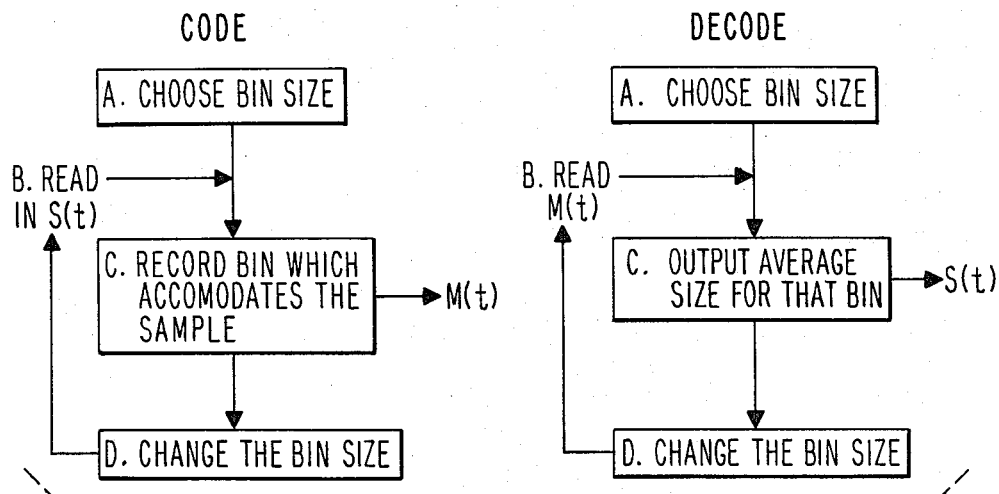
FIG. 8 shows a schematic flowchart of an adaptive quantization process used in the method of the invention.
Figure 9:
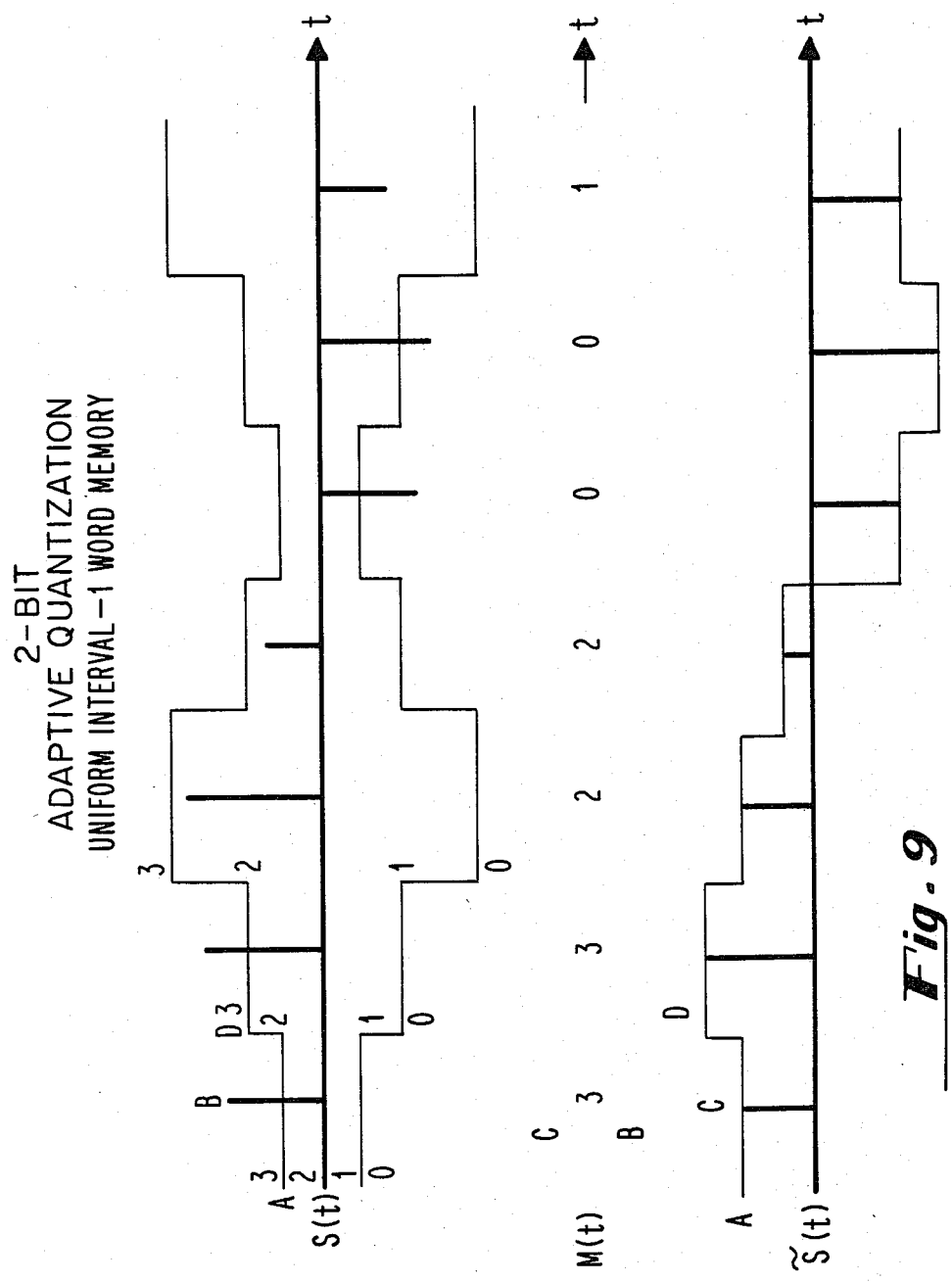
FIG. 9 shows pictorially how the adaptive quantization method of FIG. 8 operates.

The method of the invention is illustrated in block diagram and pictorially in FIGS. 8 and 9 respectively. Initially, a finite number of "bins" are set up which accommodate the approximate range of values expected for the first few data samples. The number of bins is equal to two raised to the power equal to the number of binary digits per word specified. In other words, two bits (b=2) would allow four bins or states; three or four bits to be transmitted per sample would allow 8 or 16 bins, respectively. As a sample S(t) comes in, the identification M(t) of the bin which accommodates the sample is recorded. Then, in accordance with a time invariant formula involving only the bin number of the previous samples, the bin size is changed with respect to the bin within which the sample was chosen. Thus, for example, if the signal falls in the largest bin, the bin sizes are expanded for the next sample. The bin sizes represent uniform intervals so all the bins are changed by the same factor. These factors may be determined for normally distributed signals with various correlation coefficient as set forth in the article by Jayant referred to above, as well as in his article "Adaptive Quantization with a One-Word Memory" *Bell System Technical Journal*, V. 52, No. 7, September 1973, pp. 1119–1144 and in J. Max, "Quantizing for Minimum Distortion" *IRE Transactions on Information Theory*, V. 6, pp. 7–12 (1960).

The error E in any particular sample can be written as $$E = |e| - |\hat{e}|$$

where E is the actual sample and $\hat{e}$ is the quantized sample. Absolute values are chosen for the definition, as the sign of the signal is preferably handled separately; that is, both e and $\hat{e}$ are made to have the same sign if e is not equal to zero. The quantization is performed such that any e in the interval $$(n-1)Q \leq e \leq nQ$$

is quantized as $$(n - \tfrac{1}{2}) Q$$

where Q is the variable quantization interval and n is the bin number $(1, 2, 3 \ldots, 2^{b-1}, 2^b)$. Where N is equal to $2^b$, the largest bin, any e in the interval $$(N-1)Q \leq e \leq \infty$$

is quantized as $$e = (N - \tfrac{1}{2})Q.$$

Assuming that the actual sample has an equal probability of being anywhere in the interval, it follows that the error E will be roughly proportional to Q, the quantization interval. Since the adaptive quantization scheme allows Q to increase and decrease as the signal does, the errors (assuming a uniform probability distribution in the interval) also increase and decrease. This correlation of the magnitude of the errors with the signal result in errors in the spectral bandwidth of the signal. This situation, a consequence of any adaptive coding scheme, is contrary to the object that the errors be small and outside the bandwidth of the signal, as discussed above. The solution according to the method of the invention is to filter the signal prior to quantization such that the output is as broad band as possible, with the smallest possible average amplitude. In this way, variations in the bin size can be minimized and therefore so can the errors.

Figures 10, 11:
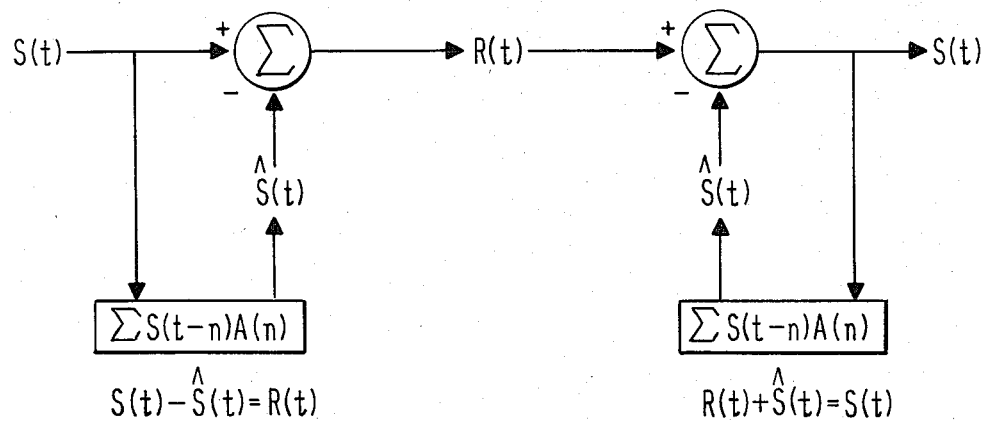
FIG. 10 shows the invertibility of the deconvolution used in the technique of the invention.
FIG. 11 shows the manner in which the linear prediction coding operator can be used to reduce error.

In addition to the above listed two criteria for the filtering operation, that is, reduction of the amplitude variation and broadening of the spectra, it is required that any filtering be invertible at least in the noiseless case, so that the original data can be recaptured from the filtered and coded sequence. It has been observed that the most sensitive process in normal seismic processing operations is deconvolution; that is, separation out of repetitive events in the seismic data. It follows that if the seismic records were to be corrupted at any stage by coding, preferably it would be after deconvolution. The fact that deconvolution can be inverted additionally aids in this judgment. The deconvolution process may be broken down so as to be invertible is shown in FIG. 10. Incoming samples S(t) are broken down by the summation over all n of the product $\hat{S}(t-n) A(n)$ where A(n) is the prediction operator. Comparison of S(t) and $\hat{S}(t)$ yields R(t), the departure of the predicted sample from the actual sample or "predicted error." At a later time, the inverse operation may be performed on R(t) to yield the exact input S(t).

It is well known that the deconvolved trace has a broader spectrum. This may be accomplished by solving for the prediction operator A(n) which in a preferred embodiment is chosen to minimize the sum of the squares of the prediction error trace. A minimization process for this variance is outlined in FIG. 11. I is the sum of all the squares of all the R(t)'s each of which $= S(t) - \hat{S}(t)$, where $\hat{S}(t)$ is in turn equal to the sum overall the terms [S(t−n) A(n)]. Therefore, one can solve a series of n linear equations for A(n) where $$\frac{\partial I}{\partial A(n)} = 0$$

to minimize I. In a particularly preferred embodiment of the invention, solution of the resulting set of linear equations amounts to solving a Toeplitz matrix for the autocorrelation vector shifted one sample ahead.

Regardless of what prefiltering operation is performed on data before quantization, it will be appreciated that the inverse filter when applied to reconstructed data will affect the quantization noise in the same manner as the signal. The inverse filter effect is more noticeable on data quantized with the simple DPCM coding scheme. The errors even though barely noticeable in the difference trace, are greatly amplifed upon inverse filtering by integration. Consequently a feedback mechanism must be employed in order to control the noise. The requirement of feedback in turn adds two more requirements to the prefiltering operation: that its operator be minimum delay and be designed from a zero-mean data window. There are numerous well-known methods available to solve for such a prediction operator, but all involve a trade-off between the degree to which the mean squared error is minimized and the rate of convergence of the reciprocal operator. The present inventor has found that the autocorrelation method results in the most computationally efficient operator as well as resulting in a suitably front loaded operator, which allows smoothing of the prediction error resulting from the adaptive quantizer. As the non-linear quantization results in noise of both low and high frequencies, the autocorrelation method should be applied to the autocovariance (mean removed from the data) rather than the autocorrelation in the design of the prediction operator so that low frequency drifts should not be predicted when actual data is processed. This provides an instructive contrast to the speech compression techniques mentioned above. In speech compression, the low frequencies (i.e. below about 200 Hz) can be filtered as they contribute little to the signal, and can be disregarded in operator design. In seismic data compression, the typical frequency range is 5–50 Hz, and accordingly such low-cut filtration would remove all data of interest. Hence, an autocorrelation technique as mentioned above should be used. See Rubiner and Schafer, *Digital Processing of Speech Signals*, Prentice Hall, Englewood Cliffs, NJ (1978), esp. Chapter 8, at section 8.1.1. By subtraction of the mean value from each of the samples in the window of interest, the overall sample can be centered on zero, thus avoiding prediction of low-frequency drift and unstable coding.

Figure 12:
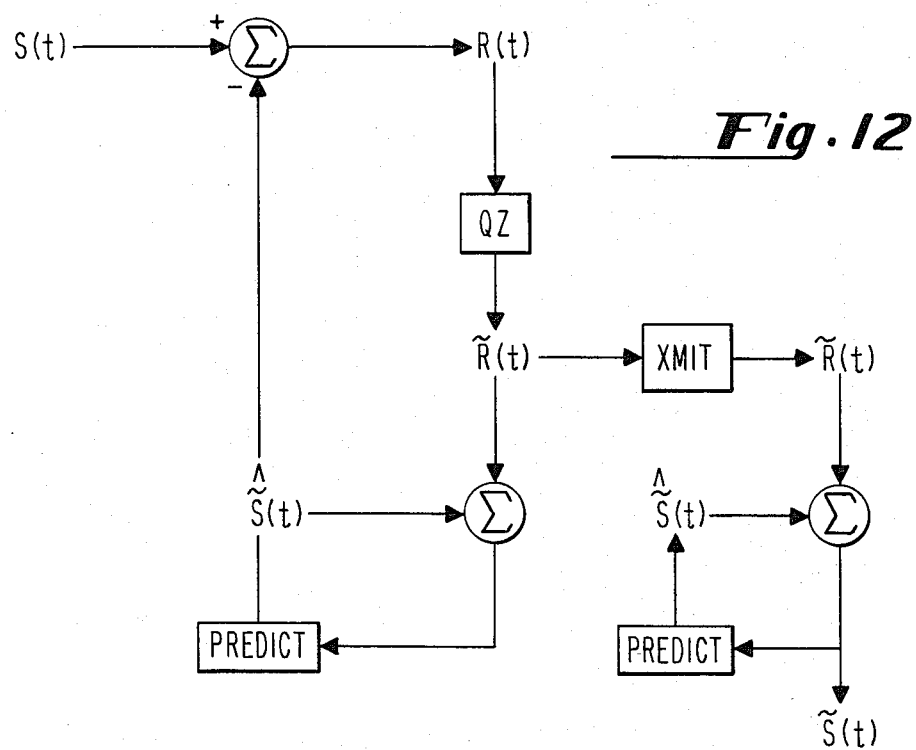
FIG. 12 shows how feedback can be applied to the overall system shown in FIG. 13.

FIG. 12 shows a flowchart of the loop with feedback added. In addition to the loop shown in FIG. 10, a second summation loop comprising a summation node and a prediction step yielding the formulation of an S(t) fed back to the main summation node is incorporated. In this way an R(t) is what is transmitted; that is, an estimated error, calculated according to a definable process, which can be decoded at the receive side, as also indicated in FIG. 12, is transmitted.

The decompression operation shown in FIG. 12 proceeds as follows. The bin size $\tilde{R}(t)$ is passed to a summation node at which it is added to the predicted value of the next sample $$\hat{\tilde{S}}(t)$$

generated by the inverse prediction operator in response to the output of the previous summation, $\tilde{S}(t)$. The output of the summing node becomes the next $\tilde{S}(t)$, and is the next reconstructed sample. The summation $\tilde{S}(t)$ is also fed to the prediction operator to yield the next predicted value $$\hat{\tilde{S}}(t)$$

in accordance with $\tilde{R}(t)$.

Summarizing, the method of the invention involves solutions of several problems as follows. The first problem is to minimize the number of possible states or bins into which the data can be transferred. The solution is using an adaptive quantization scheme; since the number of the bin into which a given sample falls is that which is transmitted, this maximizes the advantages of the data compression method of the invention. Preferably, a uniform interval, adaptive quantization method is used; this involves the use of a one-word memory to retain the bin size from one sampling interval to the next. However, adaptive quantization results in noise which is proportional to the signal and which has similar spectral components. The solution to this problem is to transform the signal into a prediction error trace R(t) before quantization; however, this raises the problem that the inverse transform of the prediction error scheme amplifies the noise and narrows the spectrum. The solution to this problem is to incorporate a feedback loop in the system, forcing the noise to pass unfiltered. The flowchart resulting from application of these concepts is that shown in FIG. 12.

Figure 14:
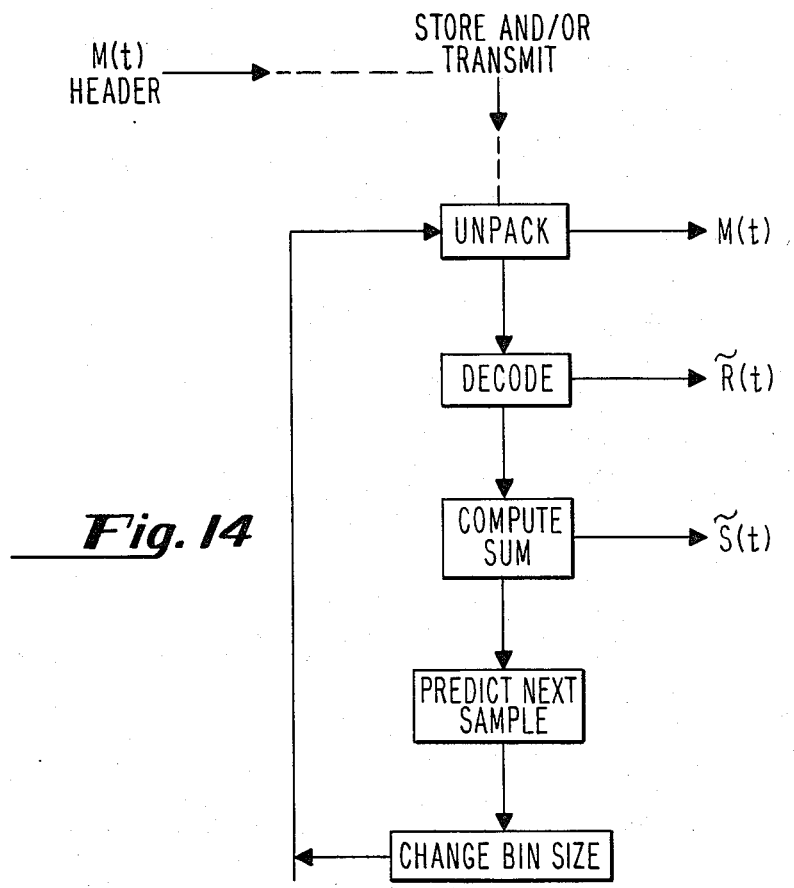
FIG. 14 shows the decompression technique used.
Figure 13:
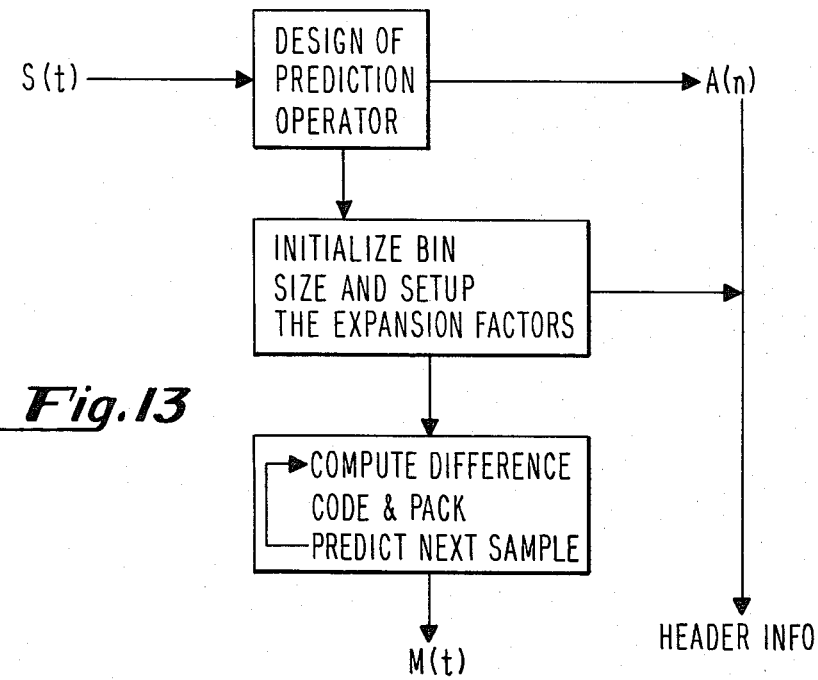
FIG. 13 shows a summary flowchart of the compression technique used according to the invention.

FIGS. 13 and 14 show the compression and decompression routines respectively. The compression of the data as shown in FIG. 13 is done at the sending location, or at the time of storage of data, and the corresponding decompression routine is performed at the receiving end, or upon retrieval. The compression flowchart shown in FIG. 13 includes computing the prediction operators, setting up the initial quantization levels and computing the error, coding it and packing the compressed trace. As shown in FIG. 14, the operator information A defining the initial conditions becomes a header and is stored or transmitted with the packed difference codes M(t), and the decompression routine operates upon these. In this connection, it is again noted that seismic data differs significantly from e.g., speech, in that it has an increasingly convoluted nature; this permits a single operator A(n) to be defined for the entire trace, record, line or region of exploration. By comparison, in speech encoding the operator must be recalculated on the order of every 20 msec; indeed, the operator itself is typically all that is transmitted and the prediction errors are synthetically generated. After storage and/or transmission, the sample is unpacked yielding M(t), the data which is decoded to yield R(t), and this is added to the predicted sample calculated in accordance with the previous samples to yield the reconstituted sample $\tilde{S}(t)$. $\tilde{S}(t)$ is used to predict the next output. One then uses the inverse of the compression scheme shown pictorially in FIG. 9 to perform the inverse of the changing of the bin size to prepare for the next sample M(t). R(t) is then used to correct that predicted output, which is then the reconstituted sample $\tilde{S}(t)$.

Those skilled in the art will recognize that correct design of the prediction operator is important to the accuracy and stability of the output of the method of the invention. In a presently preferred embodiment, the data used in computing the autocorrelation function either follows a mute curve or is set at a constant start time. The length of the window employed is at least 10 times the maximum operator length; if a short record occurs, the operator length is reduced. The mean value is removed from the data window but not from the data itself. The autocorrelation is computed assuming all zeroes outside the window of interest. The initial level of white noise is added to the center ordinant, so as to avoid difficulties resulting from inverting zeroes; the Levinson recursion routine is then used to compute the operator. The error condition is checked and if positive, computes another operator with $\frac{1}{2}$ percent more white noise added. If the white noise required is greater than 10% the trace is "killed"; i.e., not transmitted or recorded, as the case may be.

The compression routine itself can be summarized as follows. The trace is first initialized by zeroing a first predetermined number of points. Then the initial bin size is set as equal to the average of some predetermined number of non-zero absolute values encountered. The expansion and contraction factors are set according to the article by Jayant appearing in 1973, referred to above. The prediction error is then computed, the compressed sample is coded and packed, the next sample is predicted and so on, repeating the computation of error, coding and packing processes for each data sample. Stability may be confirmed continually. Thus the output of the compression routine shown in FIG. 13 is a packed integer trace containing the coded random components indicating the departure from the error and the header information including the operator and the initial bin size.

The decompression routine is shown in FIG. 14 and follows substantially the inverse process. First, the data is unpacked into integer representation. This coded trace can, in fact, be used as a gain equalized deconvolved trace or the integers can be decoded to yield an approximation of the full dynamic range of the deconvolved trace; finally, of course, using the operator supplied in the header, the original input can be reconstructed at very high fidelity. Those skilled in the art will recognize that the compression routine according to the invention, while providing up to a 10 to 1 reduction in the amount of time required, for example, for transmission of the data over a satellite radio link or for storage of the data on magnetic tape, requires some computational time for implementation. To this end, it is presently envisioned that a single computer would desirably be dedicated to this purpose, i.e., be programmed to perform the compression routine, for example, on shipboard. It presently appears that use of, for example, a "PHOENIX I" minicomputer as the coding unit 30 of FIG. 1 would be suitable.

Figure 15:
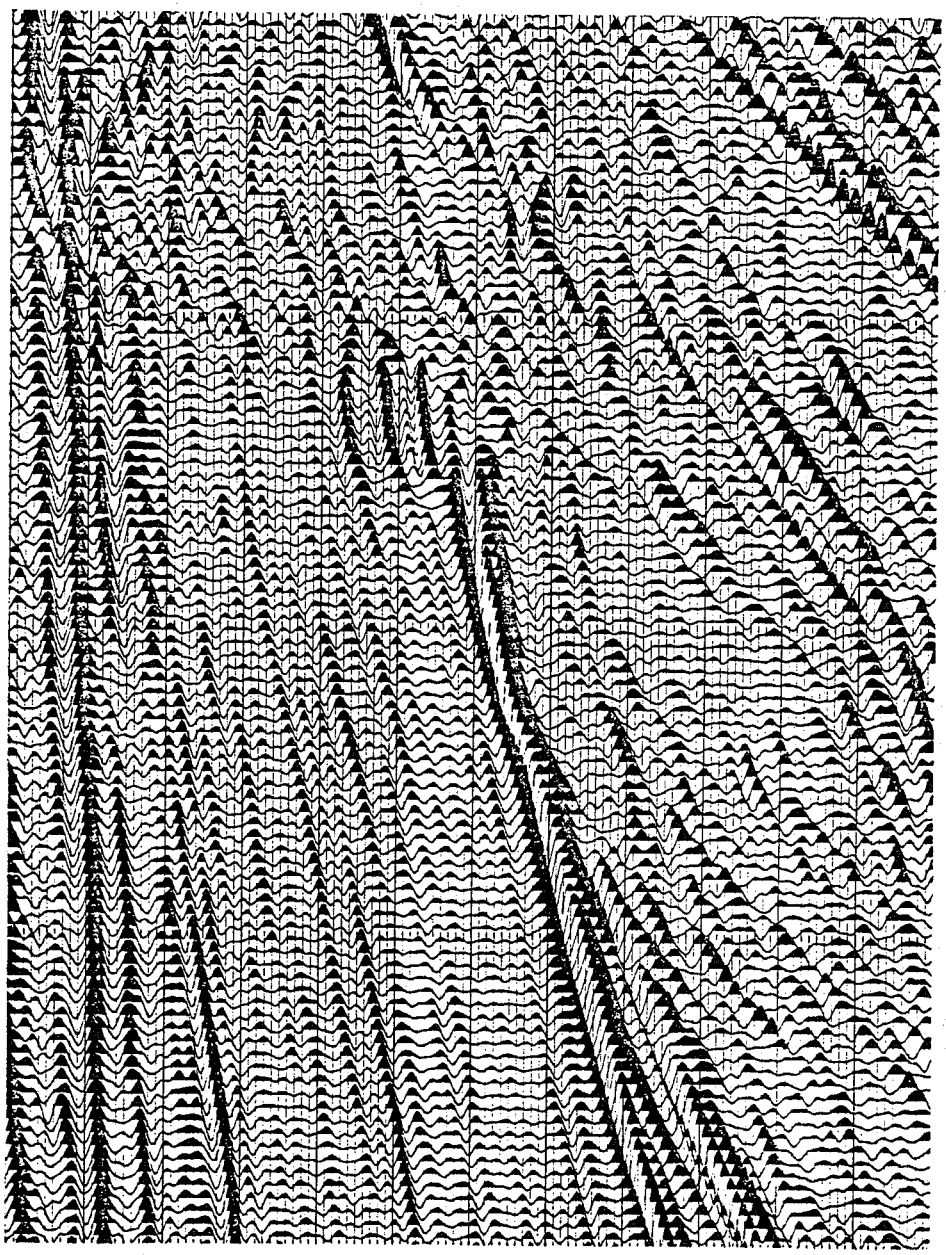
FIG. 15 shows a display of actual seismic data using full word coding.
Figure 16:
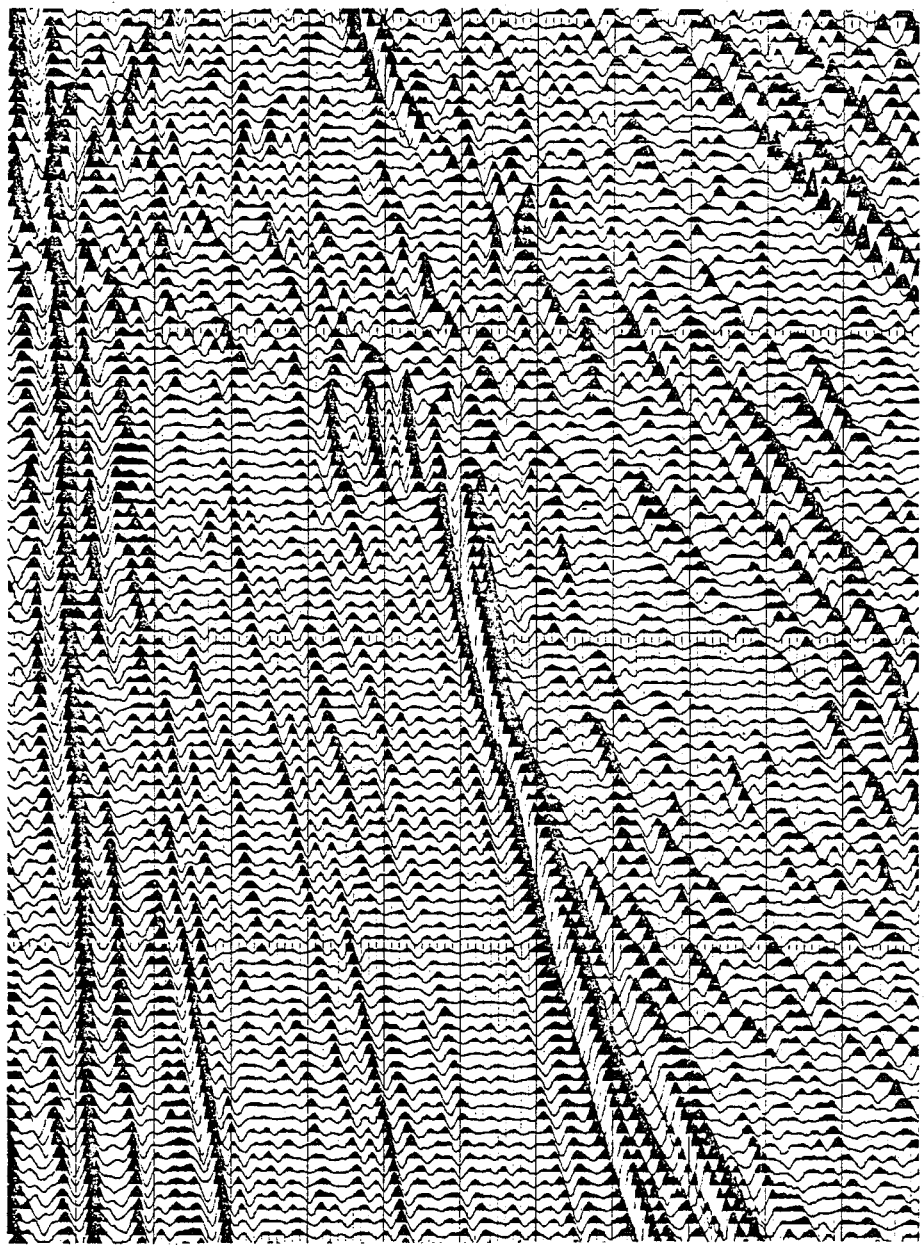
FIG. 16 shows the same data having been coded at two bits per word and decompressed using the method of the invention.

FIGS. 15 and 16 demonstrate dramatically the success of the method. FIG. 15 is a representation of seismic data having been stored in full 32-bit word array; while FIG. 16 is the same data having been compressed to a 2-bit per sample level and decompressed as above. The data of FIG. 16 could thus be transmitted at a cost of less than one-tenth that of FIG. 15. Those skilled in the art, however, will recognize that FIG. 16 is very comparable to FIG. 15 and would be quite useful in determining the success of ongoing seismic prospecting operations. Moreover, it is found that variation in the output with respect to the original is related to the scale on which the data is plotted. That shown in FIG. 16 was plotted at 12 traces per inch plotted at a speed of 5 inches per second. At lower resolution, e.g., above about 20 traces per inch, no differences at all are noted between the full word and the two-bit compressed/decompressed records. At the 12 trace per inch scale shown in FIGS. 15 and 16, FIG. 16 does show a slight high frequency jitter riding on the very long wave length seismic data, which can be mitigated readily by applying a high cut filter to the deep data in the section.

Those skilled in the art will also recognize that while decompression and reconstitution of the data in its original format is possible, it is not required before the data can be made useful. The seismic data can, for example, be processed as two-bit integers directly from the compressed format. In such a case, gain equalization and deconvolution before stacking are redundant in the normal seismic processing flow. Another output option skips the inverse filter in the decompression routine. Such an output can be processed in the usual way without deconvolution before stack. For the first option method, the four state $[-2, -1, +1, +2]$ trace is gain equalized on a sample-by-sample basis. Any amplitude differences on the stack are due to correlation between traces.

Figure 17:
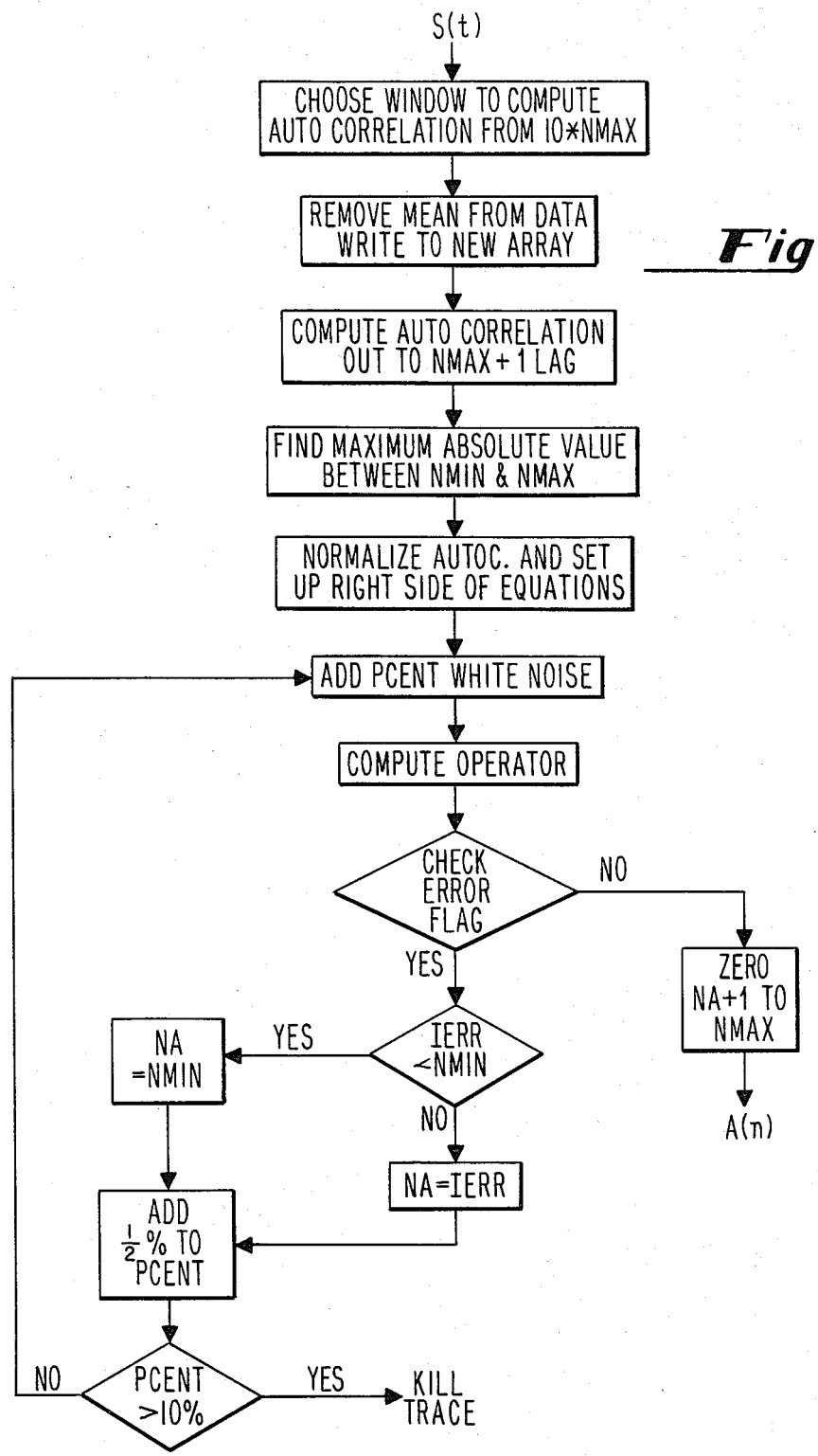
FIG. 17 shows a detailed flowchart of the operator design routine to be employed.

Reference is now made to FIGS. 17 through 20 for detailed descriptions of the processes of operator design and coding performed prior to transmission and/or storage of a compressed signal, and the unpacking and decoding routines performed after storage is terminated or upon receipt of a compressed signal. FIG. 17 shows the operator design flowchart. The incoming samples S(t) having been received, a series of samples of predetermined length representative of the data which will be compressed is chosen for computation of the autocorrelation. The mean is removed from the series, so as to eliminate any DC level. The autocorrelation is then computed over the samples between zero and Nmax lags so as to determine the linear relationship between the present sample and one at each lag. The maximum absolute value between Nmin and Nmax is then located and is the location of the operator length Na. The zero lag is then used to normalize the autocorrelation and to set up the right side of the Toeplitz equations referred to above used to solve for the operator A(n). An amount "Pcent" of white noise is added and the center ordinate of the autocovariance and the operator A(n) is then computed by solution of the simultaneous differential equations mentioned above. If a stable solution to the equations is found in this routine, the error flag will be negative and the values between Na+1 to Nmax can be set to zero and A(n) used in the compression. The length of the operator A(n) depends on the maximum stable operator length, i.e., on the error. If the error flag is raised, indicating that the operator is not stable, one-half percent additional white noise is added to Pcent and the calculation reperformed. If Pcent is greater than 10%, indicating that the procedure has been performed 18 times, no operator is computed based on that series of samples.

Figure 18:
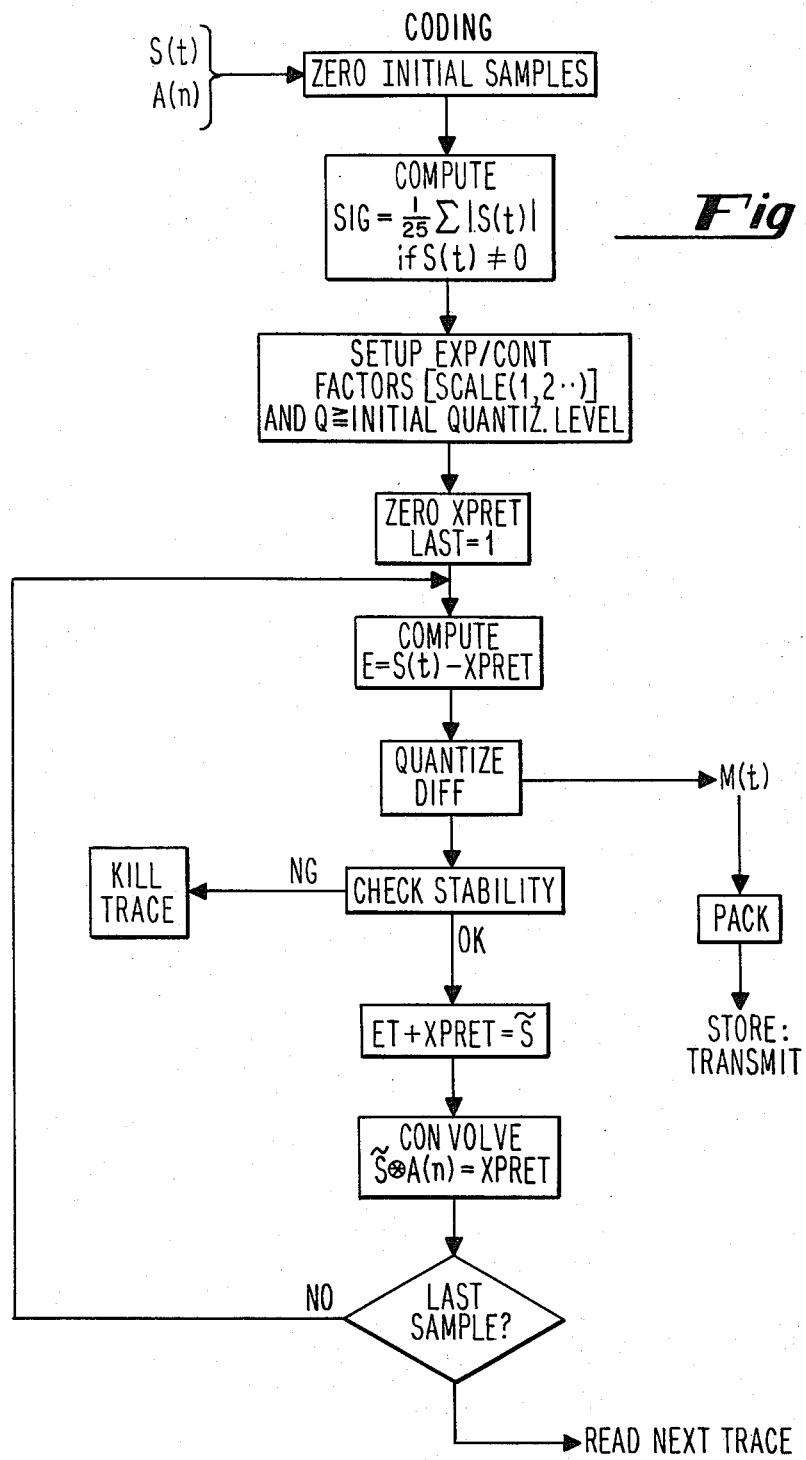
FIG. 18 shows a detailed flowchart of the coding routine.
Figure 19:
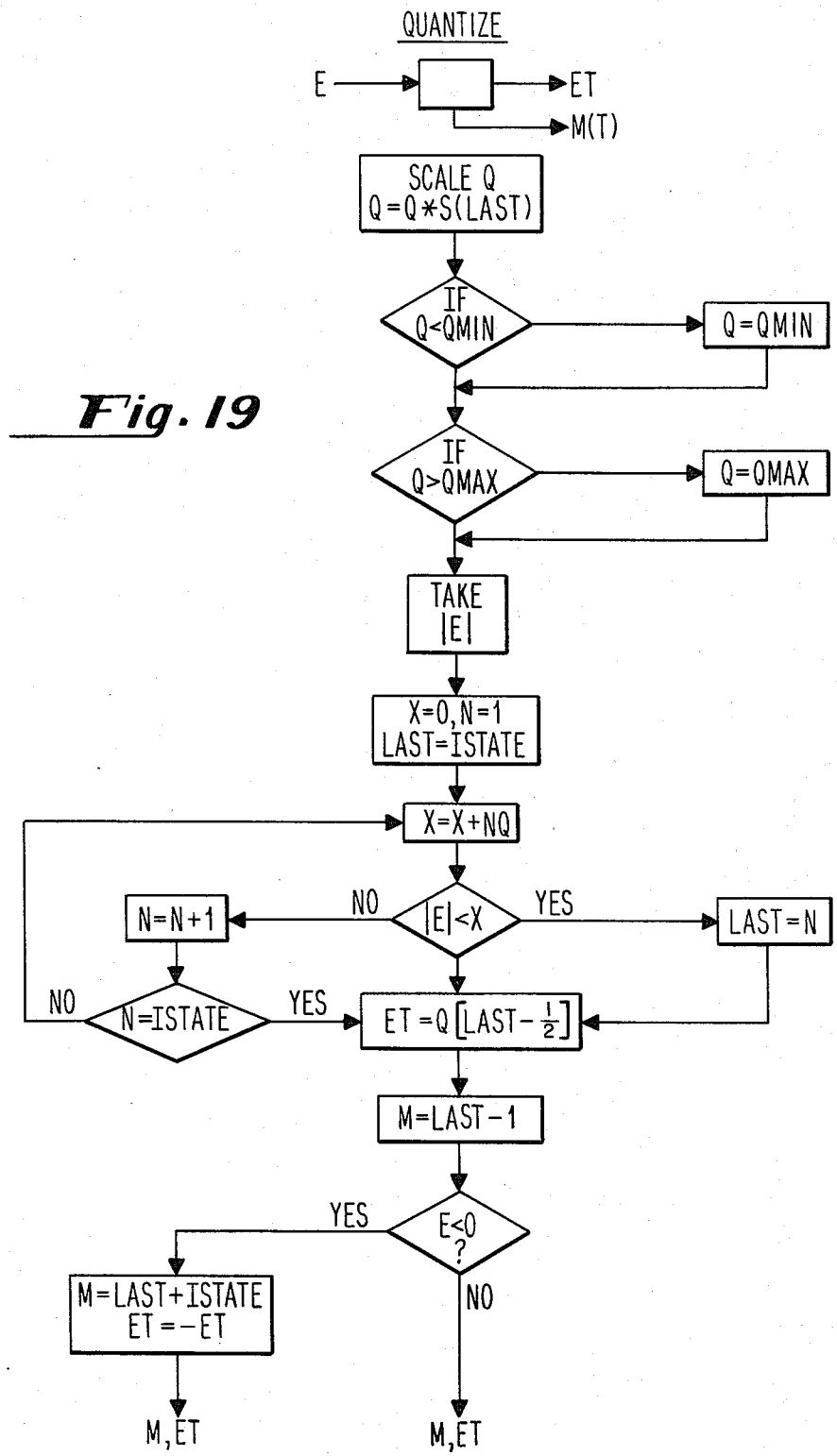
FIG. 19 shows an enlargement of the quantization portion of the coding routine shown in FIG. 18.

FIG. 18 shows the coding operation performed after the operator A(n) is calculated as above. The routine is first initialized by computing the value "Sig", the average of the absolute values of the first 25 non-zero samples. The expansion and contraction factors are then set in accordance with Jayant's articles depending on the number of bits of coded data desired, and the quantum bin size Q is set proportional to Sig, calculated as above. The value "Xpret", which represents the next expected value, is set to 0 and a counter register, "Last," is set to equal 1. The error E is then calculated using the operator as calculated above, and is equal to the actual value S(t) less Xpret. The difference is quantized by comparison of E with the various bins, which yields the quantized error value ET. The number of the bin within which the quantized error fit, M(t), the quantum number, is packed and stored as part of the record to be transmitted. The quantization process is detailed below in connection with FIG. 19. The stability of the process is then checked by comparing the absolute value of the sample with the quantum interval, that is, against the bin size. Clearly, if the bin size is much greater than the absolute value of the sample, for several samples, an error has occurred. If the stability check reveals that the operation is proceeding properly, the approximate input value S can then be calculated from ET+Xpret. This in turn can be convolved in the next step with A(n) to yield the next expected value Xpret. If this is the last sample the next trace is read; if not, the process begins again.

As mentioned above, FIG. 19 details the quantization process used in the coding process detailed with reference to FIG. 18. Here the error E is to be separated into a quantized bin size and an estimated error, M(t) and ET respectively. The process begins by scaling of Q in accordance with the "Last" value available; that is, the bin size is set to a beginning value. The bin size thus determined is compared with Qmin and Qmax, that is, with the maximum and minimum bin sizes previously determined, which amounts to an error check. The absolute value of E is used in the calculations which follow. Variables x and n are initialized, while Last is set equal to "ISTATE", which equals half the number of total bins available. For example, in the two-bit case, four bins are available, as one of four bins can be characterized by a two-bit code, thus: small positive samples fall in bin 0; large positive in bin 1, bin 2 is small negative, and bin 3 is large negative. In this case, ISTATE would be 2. X is then set equal to x+Q, and the absolute value of E is compared with x, which amounts to determining whether E fits within this bin; if yes, then M(t) has been determined. Last, the last bin selected, is set equal to n; the quantized error is set equal to the bin size Q(Last $-\frac{1}{2}$). If E is less than zero, ET is inverted while M is set equal to Last +ISTATE, that is, to the bin within which E fell. Where E is greater than or equal to x, x is incremented by Q, the bin size, and the process repeated. It will be appreciated that these last few steps are necessitated by the fact that it is desired to transmit 2 bits without a sign. Thus, the numbers of the bins corresponding to the values centered around O, that is, to $0 < E \leq Q$, $E > Q$, $Q > E \geq -Q$, and $E < -Q$ are set equal to 0, 1, 2 and 3 respectively. The carry over of Last to the "scale Q" step, with which the quantization routine begins allows the bin size to vary as the process continues thus making the quantization adaptive. For example, if bin 1, the largest bin, were that within which the absolute value of E fell, the overall bin size would then be incremented by the scaling operation. If on the other hand the absolute value of E fell within the 0 bin, the bin size would be made smaller, as clearly E would be of a small value and therefore in order to increase accuracy, the bin size should be made relatively smaller.

Figure 20B:
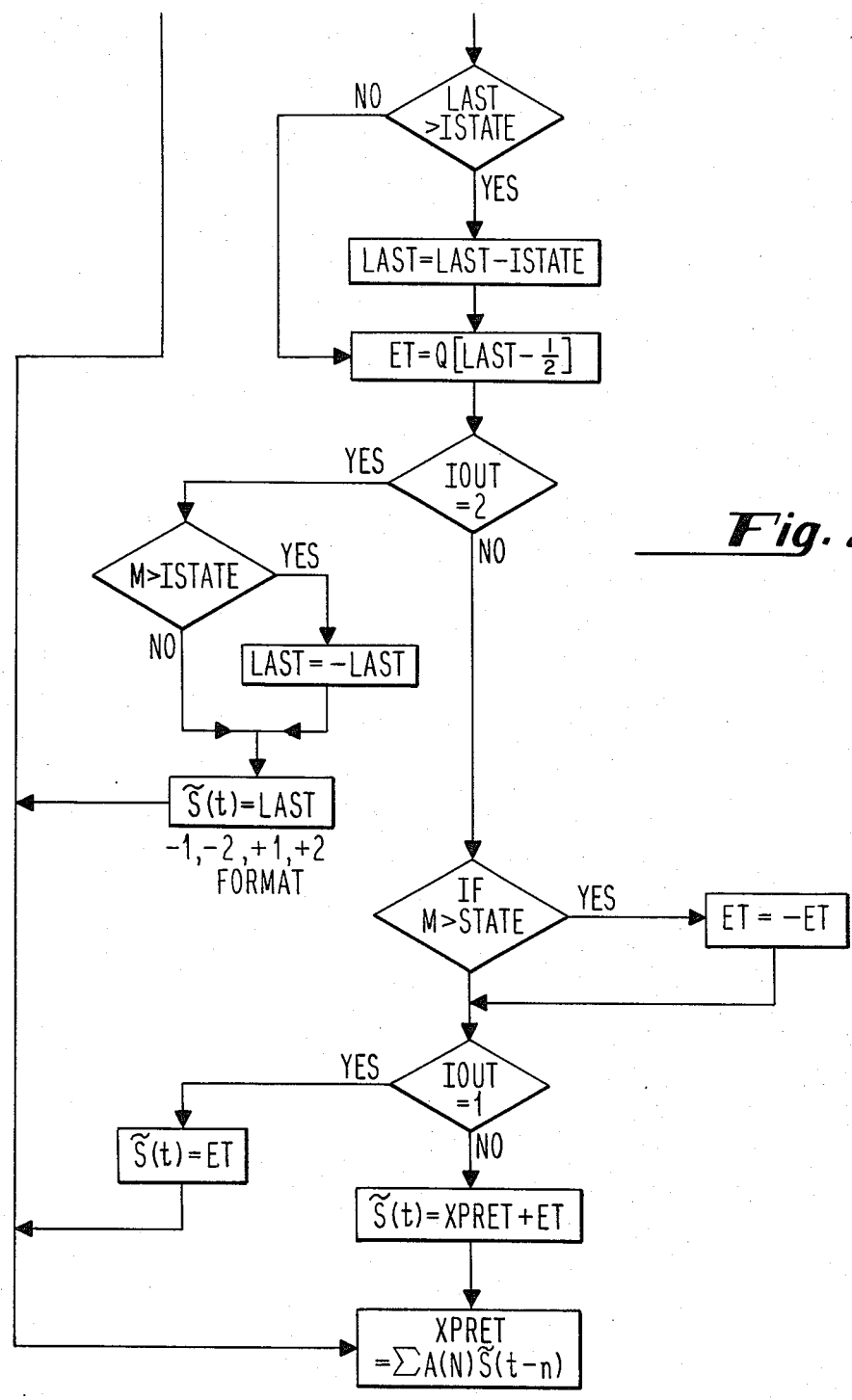

Finally, FIG. 20, comprising FIGS. 20a and 20b, shows the unpacking and decoding process performed upon receipt of data compressed in accordance with the method of the invention at a receiving location or upon release from storage. As noted above, the data can be decoded to give a reconstructed, a merely deconvolved, or a gain equalized and deconvolved trace, depending on the choice of the operation. The variables coming in are records of M(t), the bins into which each quantized error sample fit, A(n) the operator, and Sig, the initial value assigned to the bin size. The initial samples are zeroed and the expansion and contraction factors are set up as above. Q is likewise initialized as above. Q is compared with Qmax and Qmin to determine validity of this value. The quantized predicted value is first given magnitude by the bin number and the quantization level Q and then the sign is applied.

If Iout, a variable indicating the desired mode of processing the data, is equal to 2, indicating that the stored compressed data is to be gain equalized and deconvoluted, $\tilde{S}(t)$ is simply set equal to Last if M is less than ISTATE; and to −Last if not; that is to say the output function is simply equal to the relative amplitude and sign of the error sample. It is found that in general even this yields a meaningful result. If Iout is not equal to 2, the meaning being that the trace is either to be deconvolved or reconstructed, further processing is performed. If M is greater than ISTATE, the sign of ET is negative. If Iout is equal to 1, the trace is deconvolved only which involves merely setting S(t)=ET; if not, then S(t) is set equal to Xpret+E(t) which yields a fully reconstructed trace point; Xpret is equal to the sum of A(n)S(t−n) which yields the next expected value Xpret and the process is repeated.

Given the flowcharts of FIGS. 17 through 20, those skilled in the art will readily be able to fully implement the method of the invention.

It will thus be appreciated by those skilled in the art that there has been described a method for data compression specifically useful in seismic exploration applications which allows the representation of 32-bit floating point samples by a two-bit integer without loss of fidelity of reproduction. The use of the concept of adaptive quantization and differential pulse code modulation alone is insufficient to achieve this result as the noise generated by such a scheme when used on seismic data results in unstable, meaningless data. Accordingly, the signal is instead transformed into a prediction error trace, rather than a data trace, prior to quantization; in a particularly preferred embodiment, this is done through the use of linear prediction differential pulse code modulation modified as above. It will likewise be appreciated by those skilled in the art that there are numerous changes and improvements that can be made to the method of the invention without departing from its essential spirit and scope, which are therefore not to be construed as limited by the above disclosure, but only by the following claims.

I claim:

1. A method of seismic exploration, comprising the steps of transmitting acoustic energy through the subterranean structure of the earth to be reflected from an interface within the earth and return upwardly to the surface of the earth, detecting return of said energy, outputting electrical data signals in response thereto, and compressing said data signals for storage or transmission, said compression step comprising the following steps:

sampling said signals at a fixed rate to produce data samples;

generating a prediction operator;

analyzing pluralities of said samples successively in accordance with said prediction operator to yield a predicted value for the next data sample;

comparing said next data sample with the corresponding predicted value to yield a prediction error value;

quantizing said prediction error value to yield a quantum number; and storing or transmitting said quantum number;

wherein said step of generating the prediction operator includes performing autocovariance on a plurality of samples, whereby low-frequency drift of said prediction errors is avoided.

2. The method of claim 1 in which a predetermined number of successive samples is analyzed to predict the next succeeding sample and the next succeeding sample thereafter becomes the last of said predetermined number of samples, and the earliest of said predetermined number of samples is deleted from said determined amount of samples.

3. The method according to claim 1 wherein said quantization is adaptive whereby increased accuracy can be realized in the quantization of said prediction error values.

4. The method of claim 1 wherein said quantization step comprises categorizing each of said error values as belonging to one of a fixed number of discrete states, said states forming a continuous range in which those states disposed in the center of said range have fixed bounds and those states on the ends of said range have one bound fixed to mate with those disposed in the center of said range, and one bound open, whereby all error values may be categorized as belonging to one and only one of said states.

5. The method of claim 1 wherein the bounds of said states in the center of said range are varied in response to the categorization of one or more prior samples whereby the accuracy of said quantization is further improved.

6. The method of claim 1 wherein a plurality of quantized error values corresponding to a given period of seismic exploration are stored or transmitted preceded by a header comprising the initial conditions of said data compression step, whereby data compression may be performed.

7. A method of compression of samples of seismic signals, comprising the following steps:

generating a prediction operator by analysis performed with respect to a predetermined number of said samples;

applying said operator to a series of said samples of predetermined length to yield a predicted value for a next sample;

measuring the difference between said predicted value and the next sample;

comparing said difference to a series of numbered ranges of variable size;

recording the number of the range within which said difference fits;

varying the size of said ranges with respect to said number; and removing the mean values of said predetermined number of samples prior to generation of said prediction operator, so that low-frequency drift of said measured differences is avoided.

8. A method of seismic exploration of the earth comprising the steps of:

transmitting acoustical energy into the earth to be detected from interfaces within the subterranean structure of the earth;

detecting return of said energy to the surface of the earth and outputting electrical data signals in response thereto;

sampling said electrical signals at regular intervals; and processing said sampled signals to generate a pictorial representation of the subterranean structure of the earth, wherein said samples are compressed prior to storage or transmission and decompressed prior to generation of said pictorial representation of the subterranean structure of the earth, said compression including the following steps:

In a first SET UP mode:
 selection of a series of said samples comprising a predetermined number of said samples;
 removal of the mean values of said samples from said series of samples; and
 generating a prediction operator using said series of samples having had the mean values removed therefrom; and In a subsequent RUN mode:
 utilizing said prediction operator to generate predicted values for successive samples;
 measuring the difference between actual received successive samples and the predicted values therefor;
 characterizing said difference by comparison thereof with possible ranges of difference values;
 identifying the one of said ranges within which said difference value falls; and
 storing or transmitting the identification of the range within which each difference value falls, as the compressed version of the corresponding data sample, whereby substantial economies in said storage or transmission are achieved.

9. The method of claim 8 wherein the relative sizes of said ranges are varied in accordance with the relative sizes of the difference values, whereby further accuracy in characterization of said difference values is achieved.

10. The method of claim 8 wherein the initial coefficients of said prediction operation, calculated in the SET UP mode, are stored or transmitted as a header preceding said identified range values for use in decompression of said data for said additional processing steps.

* * * * *